United States Patent [19]
Gauthier

[11] Patent Number: 6,103,980
[45] Date of Patent: Aug. 15, 2000

[54] ELECTRIC SWITCH FOR MOTOR VEHICLE LIGHTING CONTROL

[75] Inventor: Christian Gauthier, Nanterre, France

[73] Assignee: SC2N, France

[21] Appl. No.: 09/171,752

[22] PCT Filed: Apr. 21, 1997

[86] PCT No.: PCT/FR97/00711

§ 371 Date: Apr. 15, 1999

§ 102(e) Date: Apr. 15, 1999

[87] PCT Pub. No.: WO97/39916

PCT Pub. Date: Oct. 30, 1997

[30] Foreign Application Priority Data

Apr. 22, 1996 [FR] France .................................. 96 05010

[51] Int. Cl.[7] .................................................. H01H 25/00
[52] U.S. Cl. ..................................... 200/61.27; 200/61.54
[58] Field of Search .............................. 200/4, 17 R, 18, 200/61.27, 61.54, 332, 335

[56] References Cited

U.S. PATENT DOCUMENTS

| | | | |
|---|---|---|---|
| 4,293,743 | 10/1981 | Iwata et al. .................................. | 200/4 |
| 4,942,273 | 7/1990 | Furuhashi et al. .................. | 200/61.54 |
| 5,047,600 | 9/1991 | Enari et al. .......................... | 200/61.54 |
| 5,272,290 | 12/1993 | Suzuki et al. ............................... | 200/4 |
| 5,283,403 | 2/1994 | Machalitzky et al. ............... | 200/61.54 |
| 5,780,794 | 7/1998 | Uchiyama et al. .................... | 20/61.54 |

FOREIGN PATENT DOCUMENTS 2227741  4/1973  France ............................ B60Q 1/00

*Primary Examiner*—Michael Friedhofer
*Attorney, Agent, or Firm*—Blakely Sokoloff Taylor & Zafman

[57] ABSTRACT

An electrical switch, in particular for controlling the lighting and signalling means of a motor vehicle, the switch comprising a housing (10) which houses a switch (200), and a lever (100) which includes a controller (120, 140, 160) that are mounted to be displaced relative to the housing (10) in at least two pivoting motions which are generally mutually crossed (I, II) and in rotary motion (III) about the axis (162) of the lever (100) in order to control respective ones of at least three basic electrical functions, the switch being characterized by the fact that the switch (200) comprise a single slide (220) which is mounted to be displaced in a plane, and a connector (166, 222; 124, 224) ensuring functional connection between the controller (120, 140, 160) of the lever (100) and the slide (220), so that the slide (220) is subjected to a specific kind of displacement for each of the three kinds of displacement of the lever (100), and is capable of ensuring respective electrical functions without disturbing control of the other two potential functions.

40 Claims, 20 Drawing Sheets

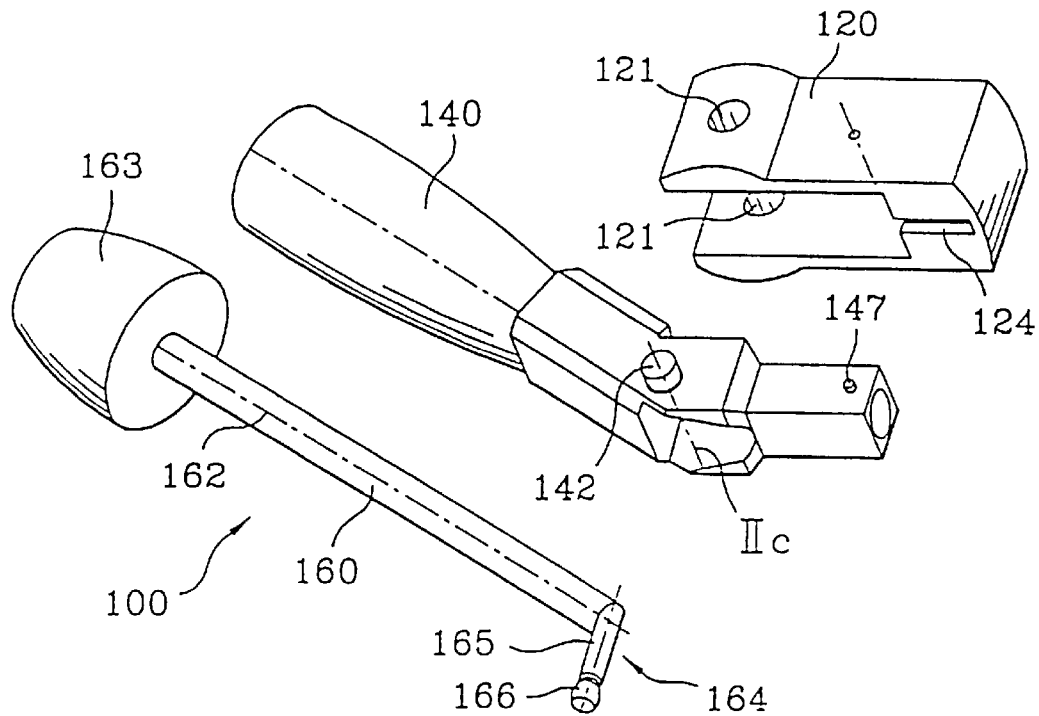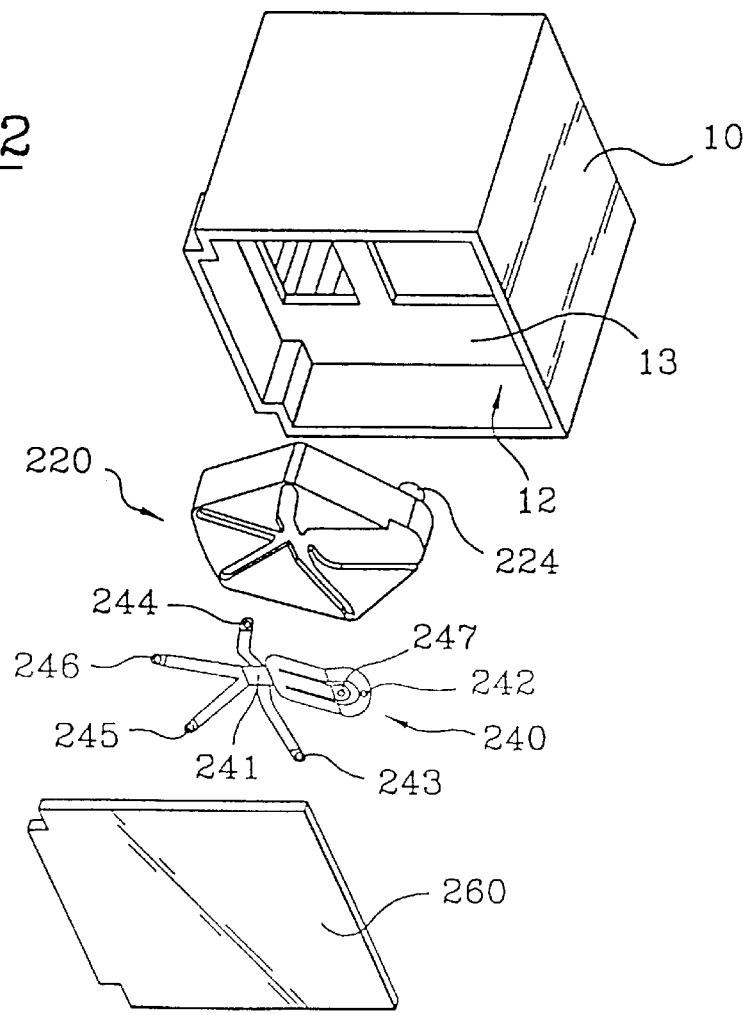
FIG.2

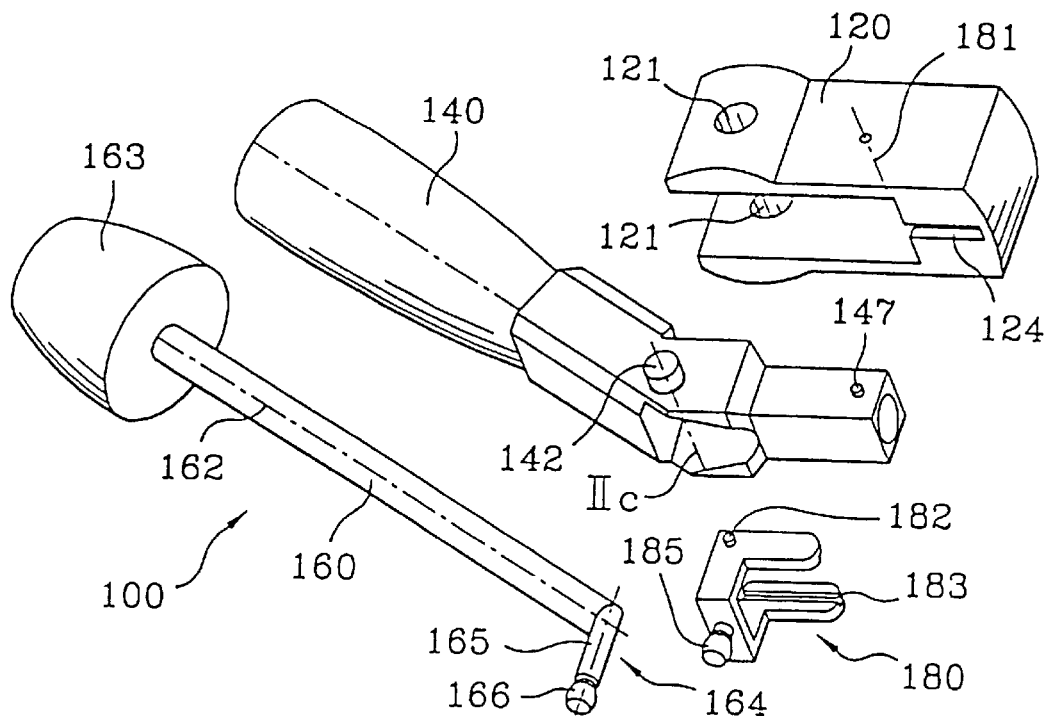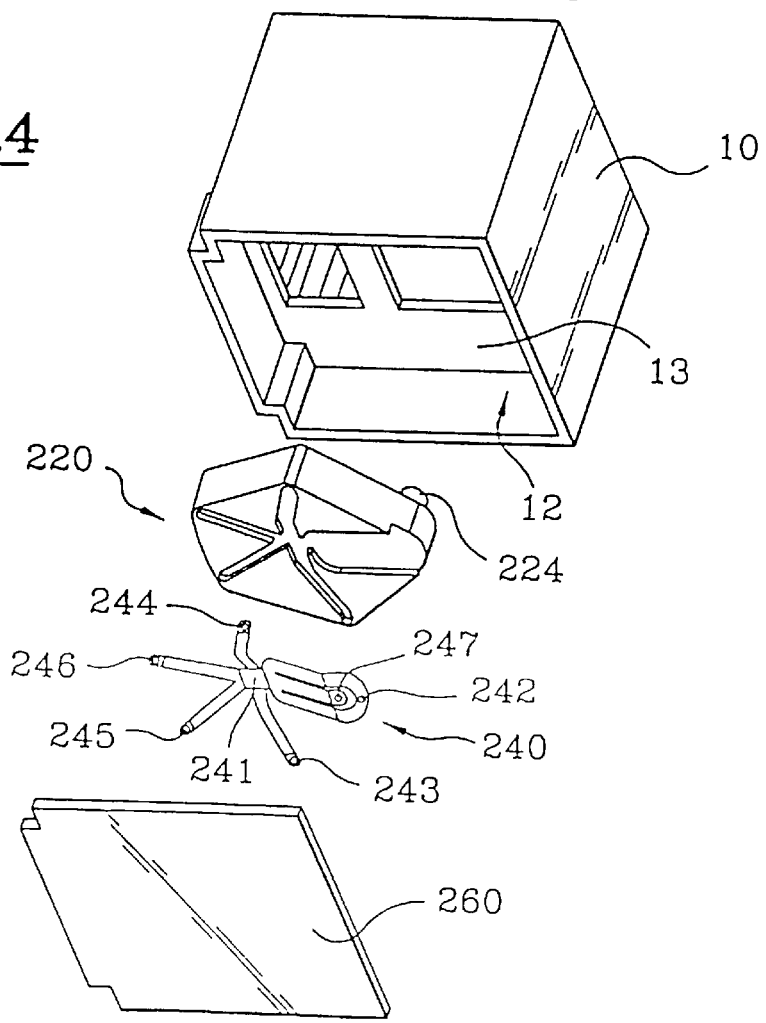
FIG.4

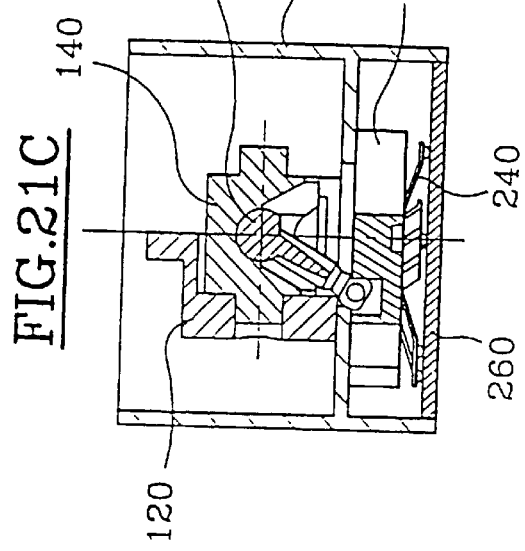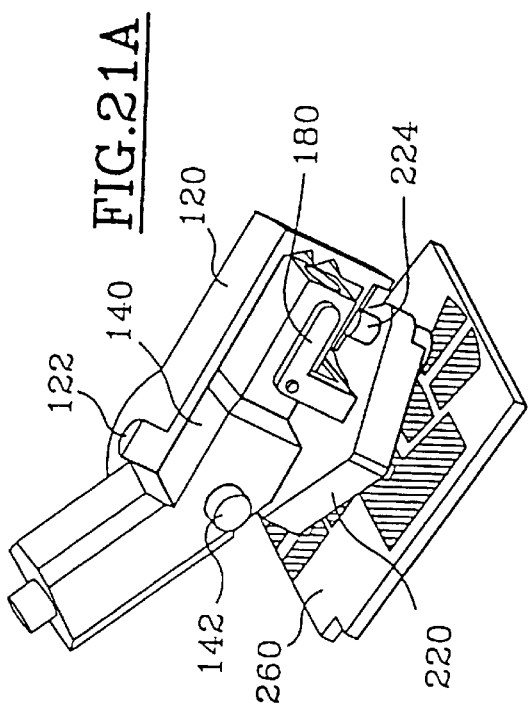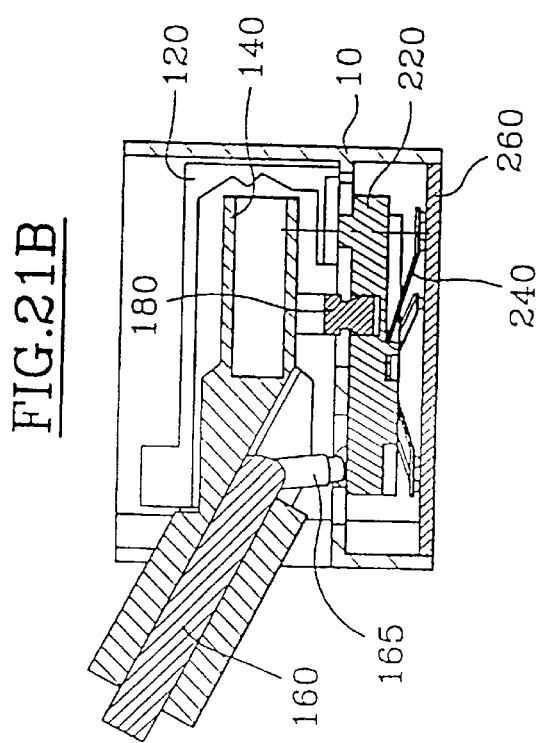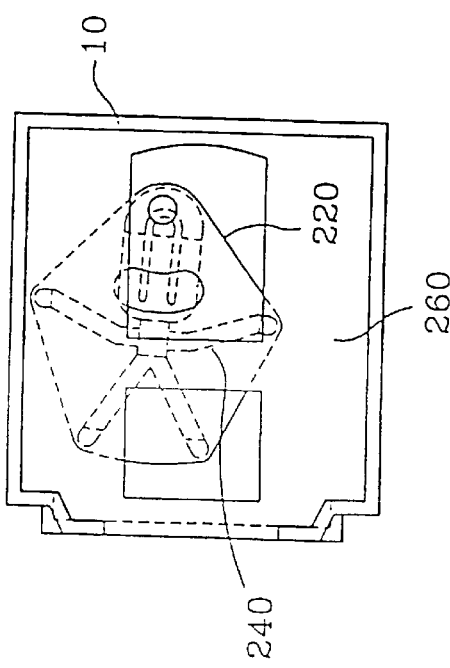

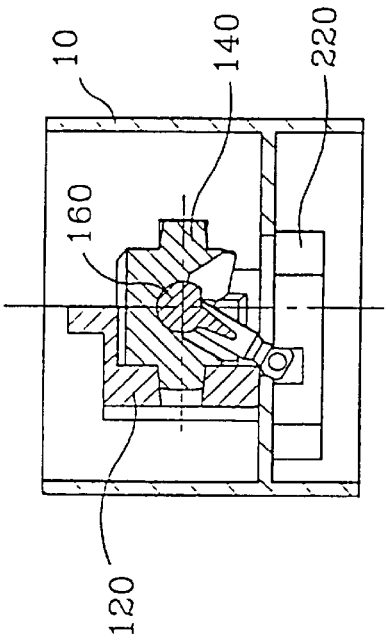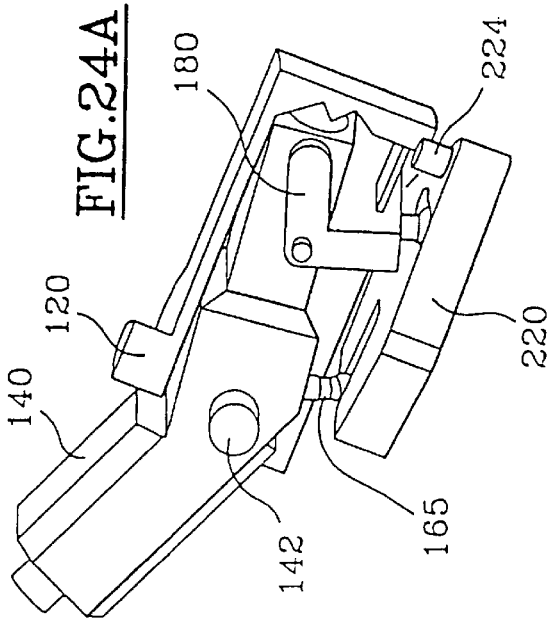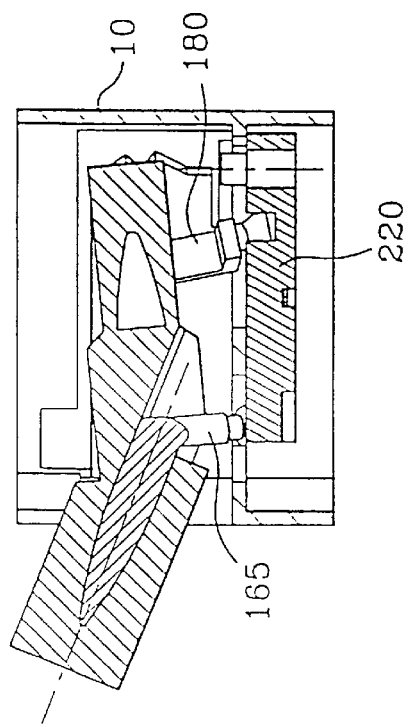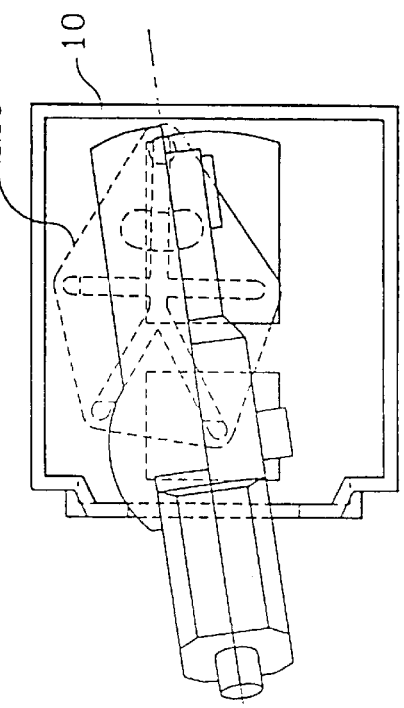

ELECTRIC SWITCH FOR MOTOR VEHICLE LIGHTING CONTROL

BACKGROUND OF THE INVENTION

Field of the Invention

The present invention relates to the field of electrical switches. It applies, in particular, to switches used for controlling lights and lighting means for motor vehicles.

More precisely, the present invention relates to a switch controlled by a lever that is capable of three different kinds of displacement or motion in order to control respective corresponding switch means, e.g. by pivoting in two planes perpendicular to each other about axes which extend substantially across the longitudinal axis of the lever, and by rotating about said longitudinal axis.

BRIEF SUMMARY OF THE INVENTION

Many electrical switches which meet the general definition given above have already been proposed. Such known switches comprise three contacting slides which are actuated by respective ones of the kinds of lever motion.

The object of the present invention is thus to improve known switches.

The object of the present invention is achieved by means of an electrical switch, in particular for controlling the lighting and signalling means of a motor vehicle, the switch comprising a housing which houses switch means, and a lever which includes control means that are mounted to be displaced relative to the housing in at least two pivoting motions which are generally mutually crossed and in rotary motion about the axis of the lever in order to control respective ones of at least three basic electrical functions, the switch being characterized by the fact that the switch means comprise a single slide which is mounted to be displaced in a plane, and functional connection means ensuring functional connection between the control means of the lever and the slide, so that the slide is subjected to a specific kind of displacement for each of the three kinds of displacement of the lever, and is capable of ensuring respective electrical functions without disturbing control of the other two potential functions.

Other characteristics, objects and advantages of the present invention appear on reading the following detailed description made with reference to the accompanying drawings that are given as non-limiting examples and in which:

BRIEF DESCRIPTION OF THE SEVERAL VIEWS OF THE DRAWINGS

FIGS. 2 and 3 are two exploded perspective views of a switch constituting a first variant embodiment of the present invention;

FIGS. 4 and 5 are two similar exploded perspective views of a switch constituting a second variant embodiment of the present invention;

FIGS. 20 to 25 show contacting positions of a switch of the present invention, and for each figure number: index A is a fragmentary view in perspective; index B is a view in longitudinal section; index C is a view in cross section; and index D is a plan view.

DESCRIPTION OF THE INVENTION

Figure 1:
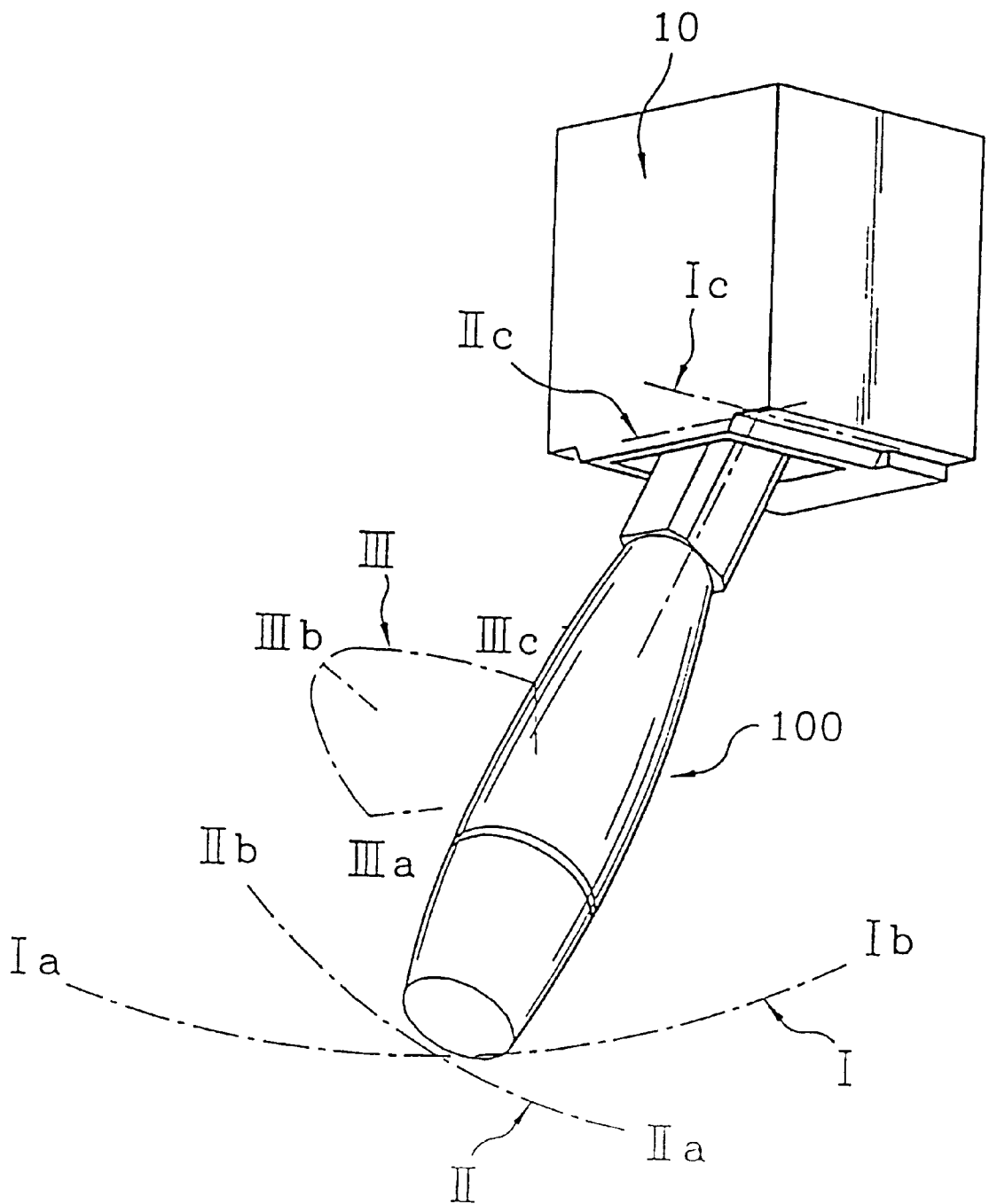
FIG. 1 is an outside, diagrammatic view in perspective of a switch of the present invention.
Figure 3:
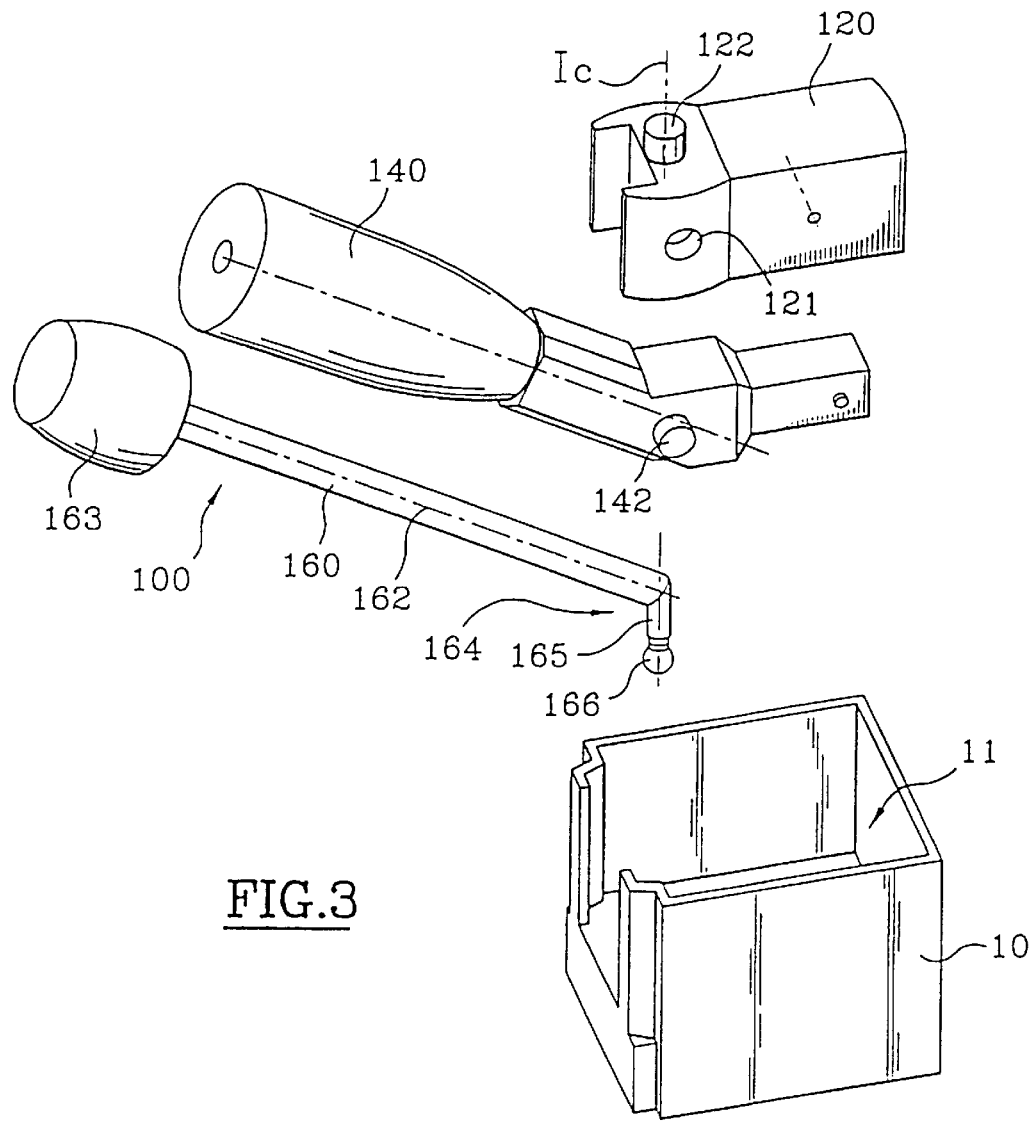

A switch of the present invention can be seen in the accompanying figures, the switch comprising a housing 10 which houses switch means 200 and includes a control lever 100.

The lever 100 is capable of being displaced in two orthogonal pivot planes and being rotated about its own longitudinal axis. A first pivot plane corresponds for example, to controlling a direction-indicator, and is referenced I in FIG. 1; the position of the lever 100 for actuating the right indicators is referenced Ia, and the position for actuating the left indicators is referenced Ib. The first pivot plane I corresponds to the lever 100 pivoting about an axis Ic. A second pivot plane, which is orthogonal to the first, is referenced II in FIG. 2, and corresponds, for example, to a headlight switch for low-beam/high-beam control of headlights or for unstable headlight-flasher control; the high-beam position of the lever 100 is referenced IIa, while its headlight-flash position is referenced IIb. The second pivot plane II corresponds to the lever pivoting about an axis IIc. Finally, rotation of the lever about its longitudinal axis is represented by reference III, with the sidelights only and side-and-headlights positions being respectively referenced IIIa, IIIb, and IIIc.

In the context of the present invention, all the above-mentioned positions are preferably available simultaneously, with the exception of the high-beam position which is accessible only in the side-and-headlights-on position.

The housing 10 may be embodied in many ways. It is preferably made by molding plastics material, or possibly by assembling a plurality of pieces.

As can be seen in the accompanying figures, the housing 10 may be generally in the form of a rectangular parallelepiped, and may be divided into two compartments 11 and 12 by a perforated partition 13.

The lever 100 essentially comprises a fork 120, a lever body 140, and a driver 160.

The fork 120 is housing in the housing 10. It is guided to pivot inside the housing 10 about the axis Ic. The axis Ic can be embodied by a pin 122, for example.

The lever body 140 is generally an elongate cylinder. It emerges outside the housing 10. The body 140 is mounted to pivot on the fork 120 about the axis IIc. The axis IIc can be embodied by two aligned pins 142 formed on the lever body 140 and engaged in complementary holes 121 formed in the tines of the fork 120.

As shown above, the axes Ic and IIc are orthogonal to each other.

The driver 160 is essentially formed by a rod which is centered inside the lever body 140. The driver 160 is capable of rotating relative to the body 140 about its longitudinal axis 162. The proximal end 163 of the driver 160 emerges outside of the body 140 and of the housing 10 so that it can be accessed by a user.

In addition, the distal end 164 of the driver 160, inside the housing 10, emerges from the body 140. More precisely, said distal end 164 is formed by a finger which is offset from the longitudinal axis 162, e.g. in the form of a finger 165 that is generally transverse to the longitudinal axis 162. At rest, the axis of the finger 165 and the axis Ic may be substantially coplanar.

The switch means 200 placed in the housing 10 essentially comprise a slide or contact-carrier 220, contacts 240, and an electrical circuit 260.

The contact-carrier 220 is formed by a rigid plate guided to move in the second compartment 12 of the housing, parallel to its main faces.

In addition, functional connection means are provided for ensuring functional connection between the contact-carrier 220 and the lever 100, and more precisely between the driver 160 and the fork 120.

The connection between the contact-carrier 220 and the driver 160 is ensured by a ball 166 formed on the end of the finger 165 and engaged in a corresponding opening 222 of the contact-carrier 220.

In the variant embodiment of FIGS. 1 and 2, the opening 222 has circular symmetry or is a hemisphere, and is complementary to the ball 166.

The connection between the contact-carrier 220 and the fork 120 is provided by a pin 224 which projects from the top surface of the contact-carrier 220 and is engaged in a groove 124 formed in the fork 120.

The longitudinal axis of the groove 124 is coplanar to the longitudinal axis 162 of the lever 160. The axis of the pin 224 is parallel to the axis Ic.

The cooperation defined between the ball 166 and the opening 222, and between the pin 224 and the groove 124 is ensured through the openings formed in the partition 13.

The person skilled in the art will easily understand that when the lever 100 is pivoted about the axis Ic, the cooperation defined between the pin 224 and the groove 124 causes the contact-carrier 220 to rotate about the axis of the finger 165.

When the body 140 is pivoted about the axis IIc, the ball 166 describes circular motion centered on said axis IIc; consequently, the cooperation defined between the ball 166 and the opening 222 causes the contact-carrier 220 to move in translation in a direction that is generally parallel to the longitudinal axis 162.

Finally, when the driver 160 is rotated about its longitudinal axis 162, the ball 166 describes circular motion centered on said axis 162; consequently, the cooperation defined between the ball 166 and the opening 222 causes the contact-carrier 220 to rotate about the axis of the pin 224.

Where appropriate, a provision may also be made for the driver 160 to move in translation along its axis 162 relative to the body 140. Such translation of the driver 160 causes the contact-carrier 220 to move in translation similar to that obtained when the body 140 is pivoted about the axis IIc, due to the cooperation resulting from the ball 166 being engaged in the opening 222.

Naturally, indexing means are also provided for the fork 120, the body 140, and the driver 160 in their above-mentioned movements. Such indexing means, known per se and essentially formed by a block which is resiliently urged against an indexing ramp, have not be shown in the accompanying FIGS. and are not described below. However, FIGS. 20A to 25A and 20C to 25C show ramps 126 formed on the inside of the fork 120 facing the end of the body 140 in order to ensure that the body 140 is indexed relative to the fork when the body 140 is pivoted about the axis IIc.

The contacts 240 and the electrical circuit 260 are designed to generate specific switch effects for each of the above-mentioned kinds of displacement of the elements of the lever 100, without disturbing the other potential electrical switch functions.

The contacts 240 are generally in the form of a single star-shaped part of resilient electrically conductive material.

The contacts 240 cooperate with the tracks 261 to 267 provided on the circuit 260.

More precisely, in the preferred, but non-limiting embodiment shown in the accompanying figures, the contacts 240 are in the form of a non-planar star having a central base 241 and six branches 242 to 247.

The base 241 is connected to the contact-carrier 220. The branches 242 to 247 are situated on the same side of the base 241, facing the circuit 260. Each branch 242 to 247 is provided with a contact tip at its free end remote from the base 241, which contact tip cooperates with a track 261 to 267.

The contacts 240 possess a plane of symmetry which substantially coincides with the longitudinal axis 162 of the lever.

Two lateral branches 243 and 244 which are generally transverse to the plane of symmetry cooperate with the respective tracks 263 and 264 for powering the switch.

Two other branches 245 and 246 in a V-shape and provided at one end of the base 241 cooperate respectively for the branch 245 with a track 265 to ensure that the sidelights are powered, and for the branch 246 with the tracks 266 and 267 for powering either the low beam or the high beam.

A longitudinal branch 247 provided on the end of the base 241 remote from the branches 245 and 246 cooperates with the track 267 to flash the headlights.

Finally, a loop-shaped branch 242 which surrounds the above-mentioned branch 247 cooperates with the tracks 261 and 262 to power either the right or the left direction-indicators.

The amplitudes and the positions of the tracks 261 to 267 are designed to ensure that the selected electrical switch effects are maintained whatever the states of the other functions or whatever the changes therein.

The tracks 261 to 267 may be of a wide variety of shapes. For this reason, the shapes of the tracks 261 to 267 are not described in detail below.

However, it can be observed that the tracks 261 and 262 are formed by areas constituting sectors of a ring, which areas are symmetrical about a plane which substantially coincides with the longitudinal axis 162. A gap is left between the tracks 261 and 262 to enable the tips of the branches 242 and 247 to pass without making physical contact.

The tracks 266 and 267 are essentially formed by rectangular areas which are in alignment along the above-mentioned plane of symmetry, the track 267 possessing an enlarged head adjacent to the tracks 261 and 262.

The tracks 263 and 264 are situated on respective sides of the track 267.

Finally, the track 265 is formed by a sector of a ring which is centered on the axis of the finger 165.

Figure 9:
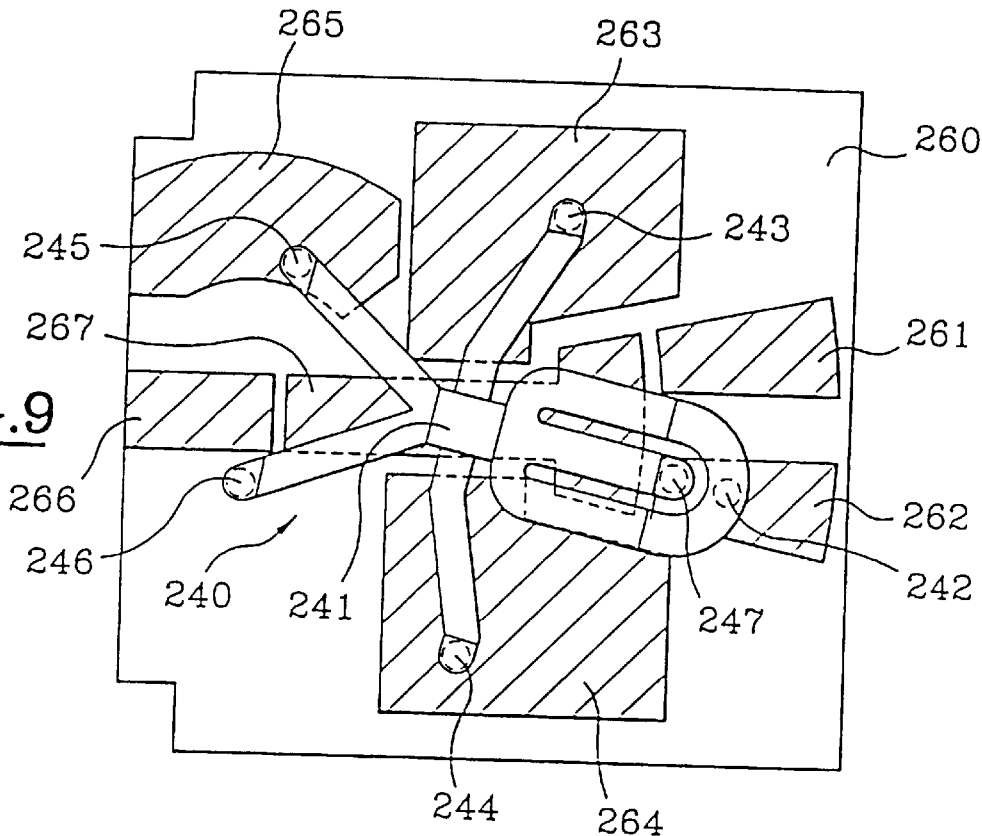
FIGS. 9 to 19 diagrammatically show various relative positions of contact blades and contact areas.
Figure 10:
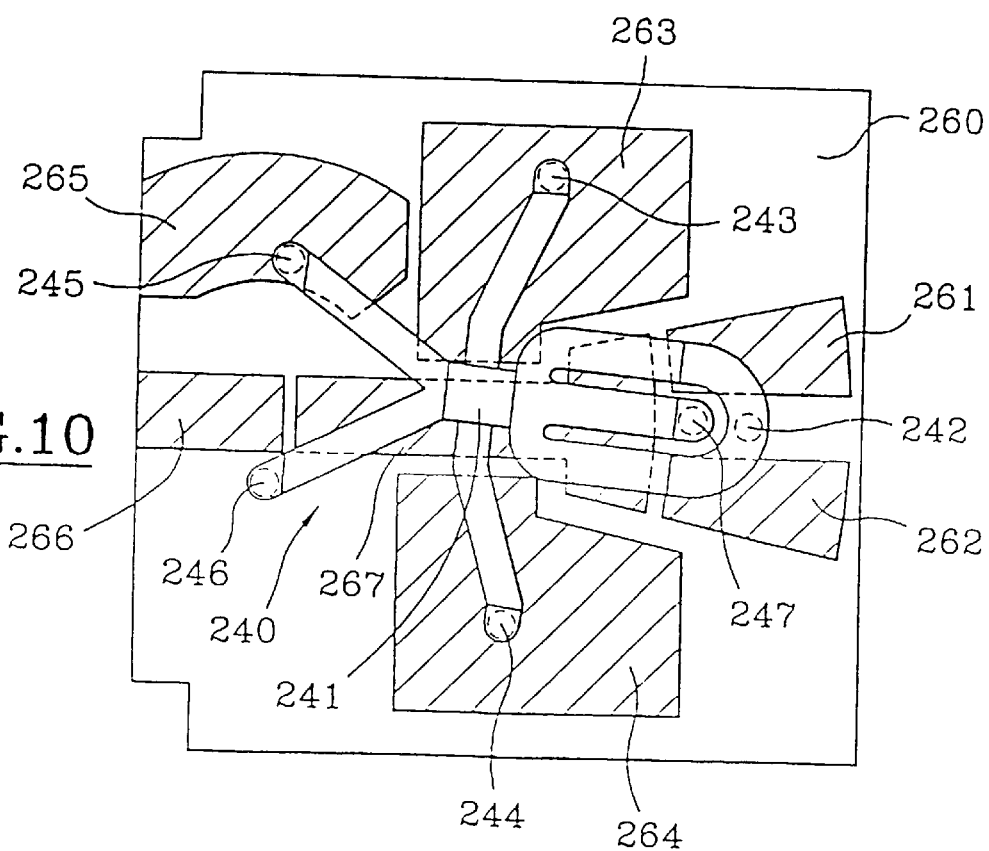
Figure 11:
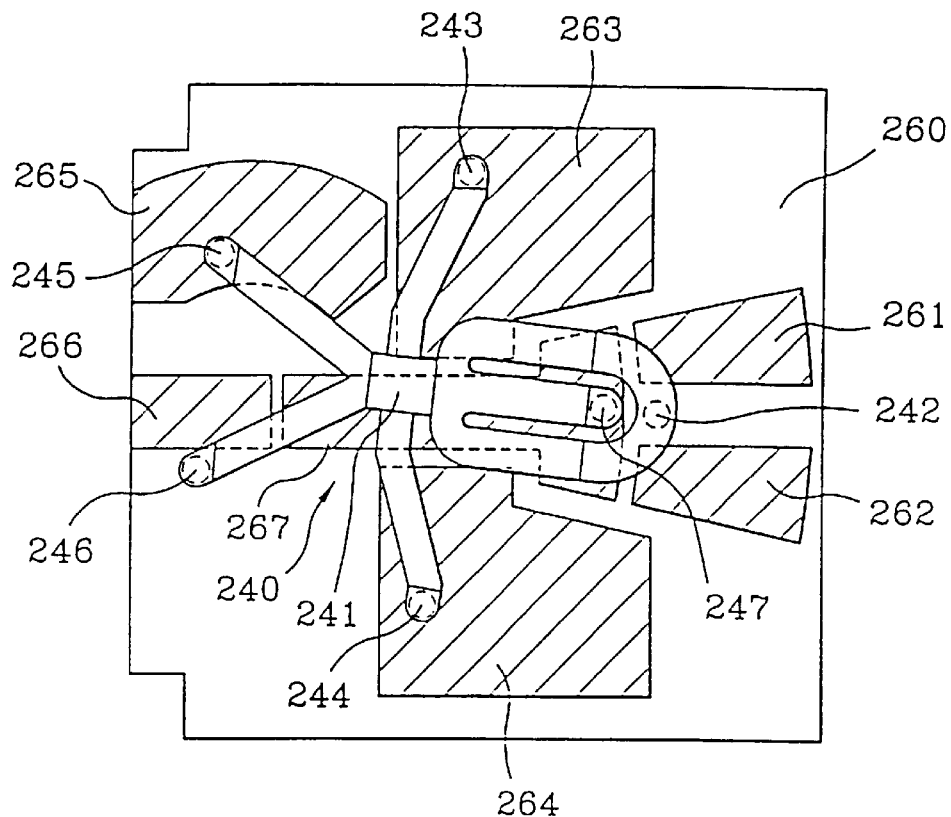
Figure 12:
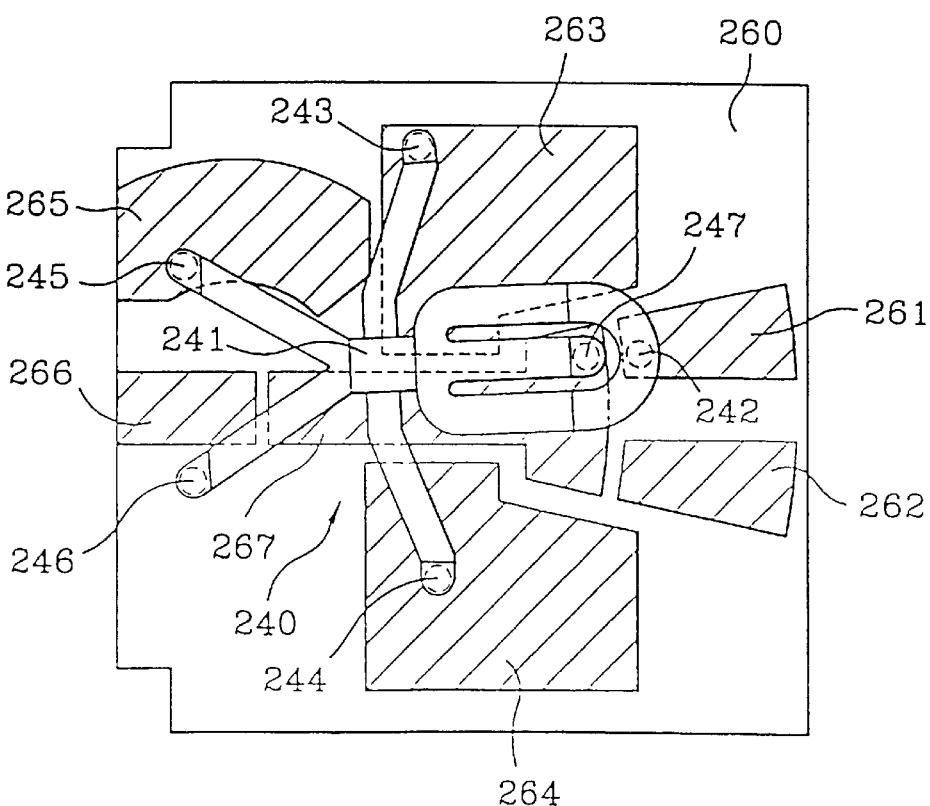
Figure 13:
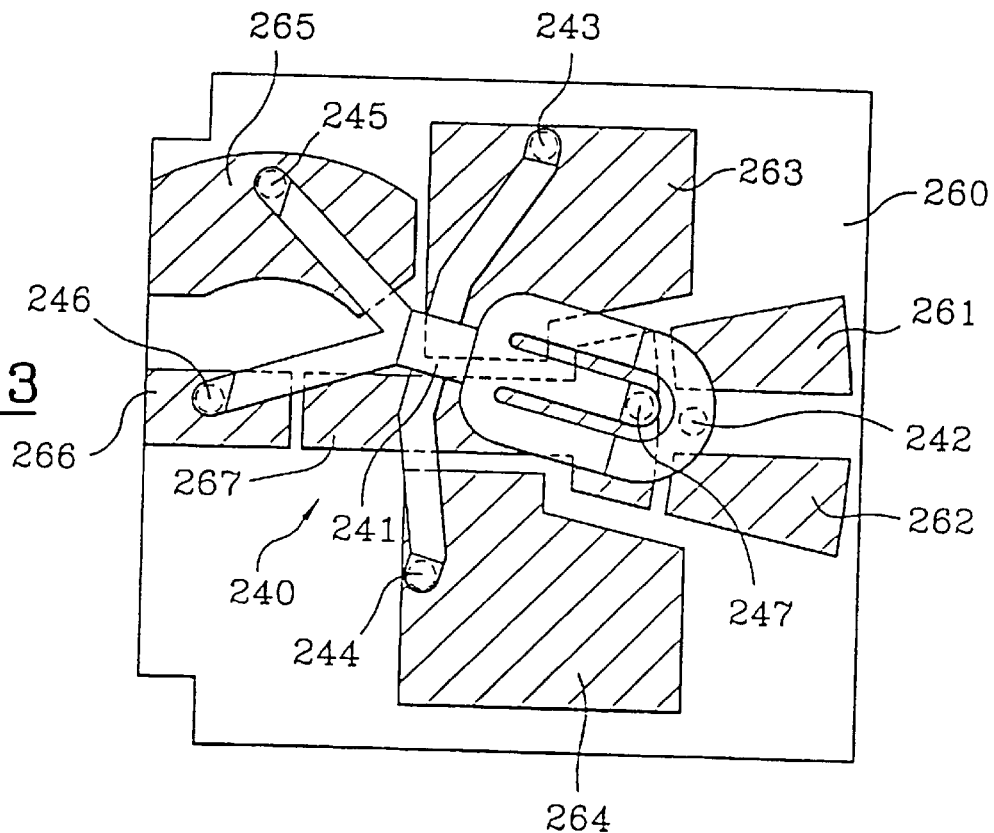
Figure 14:
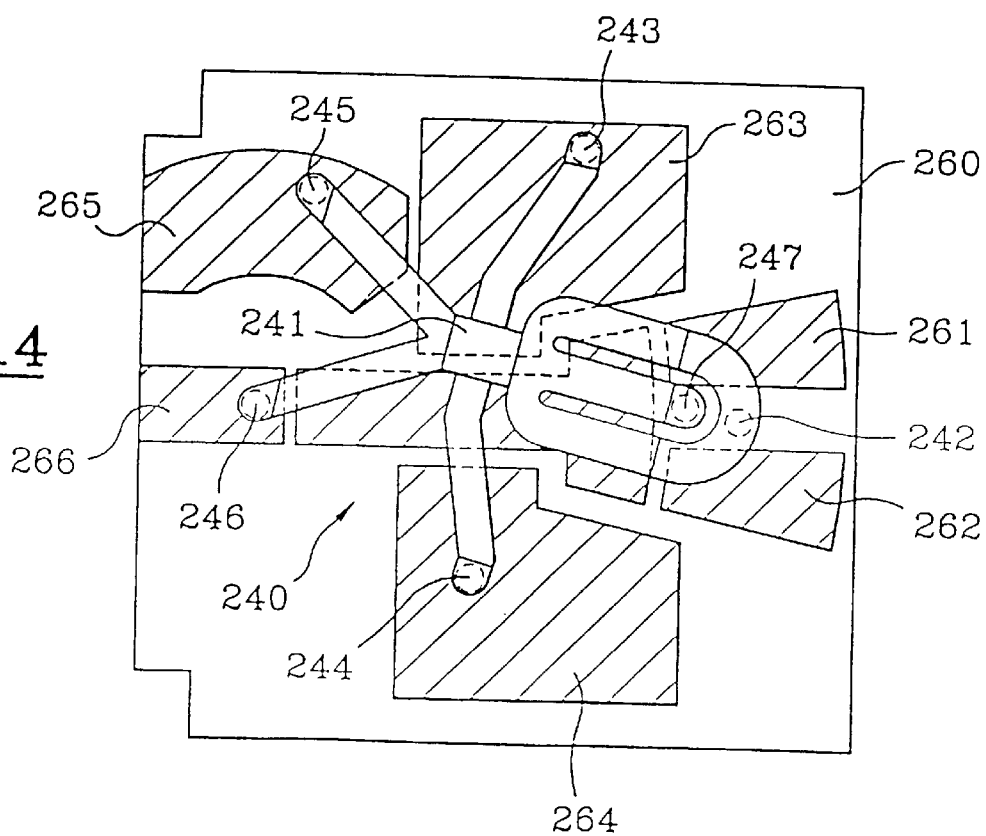
Figure 15:
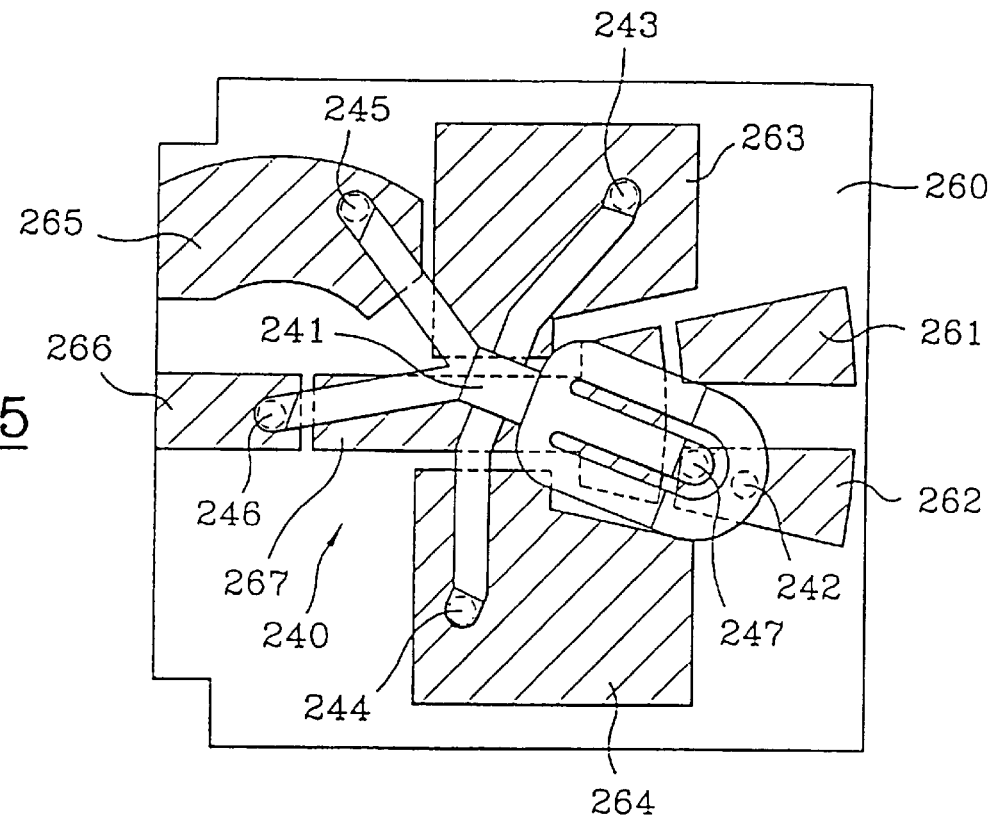
Figure 16:
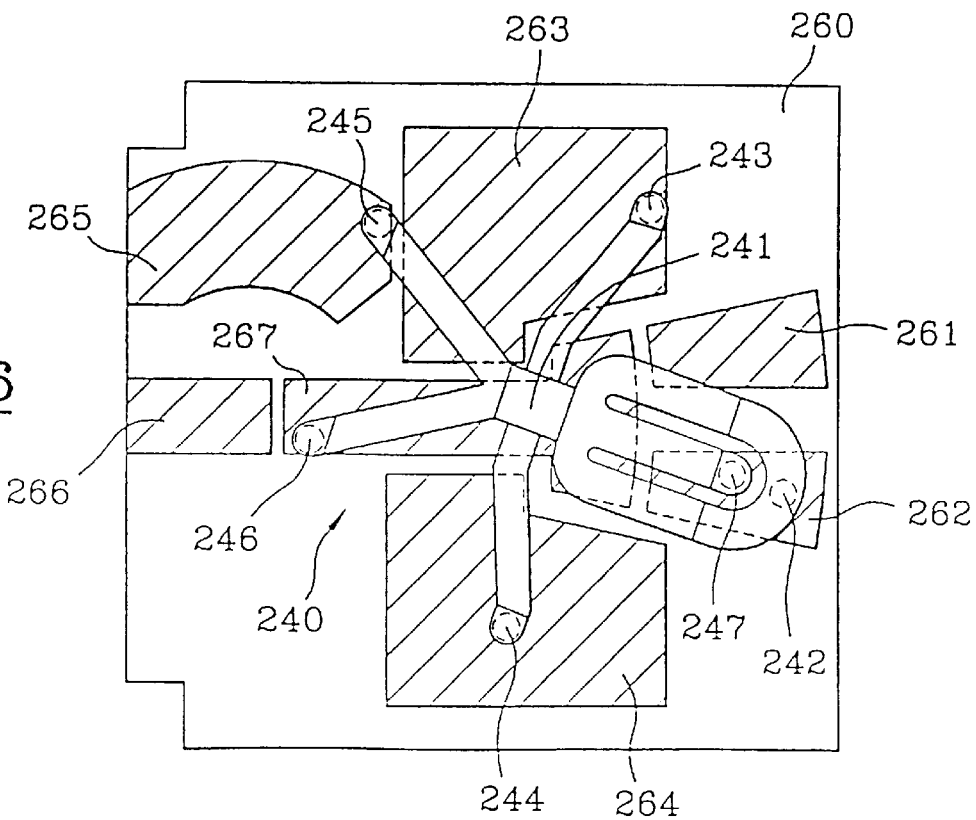
Figure 17:
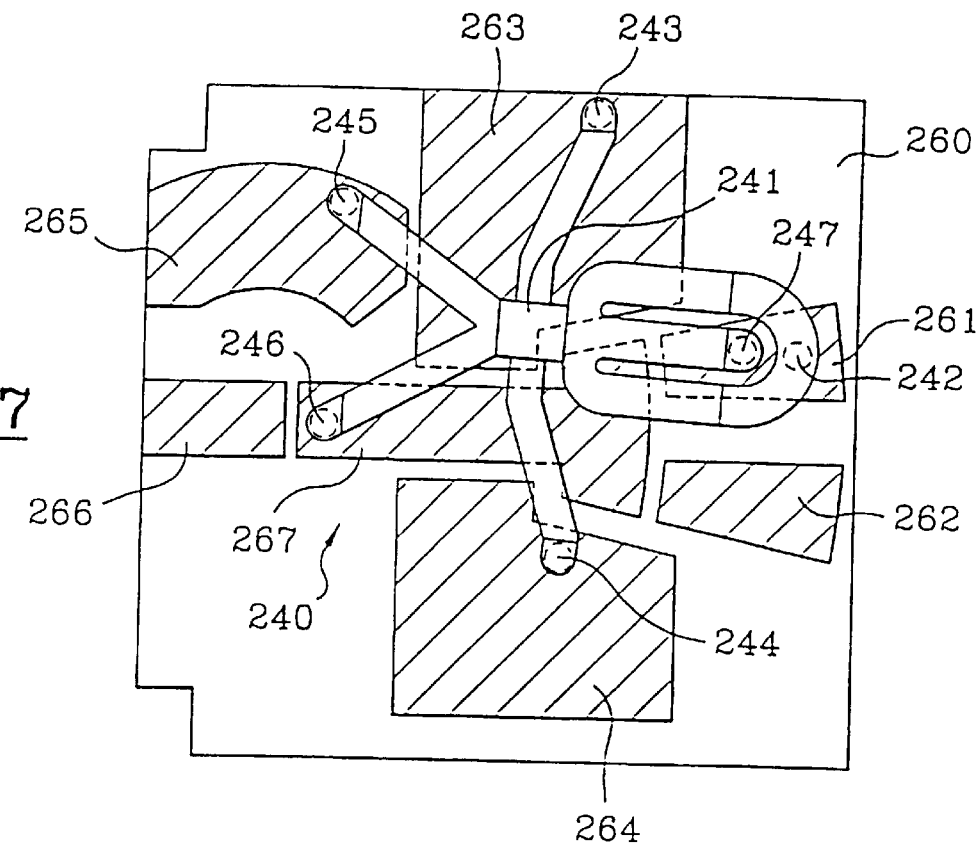
Figure 18:
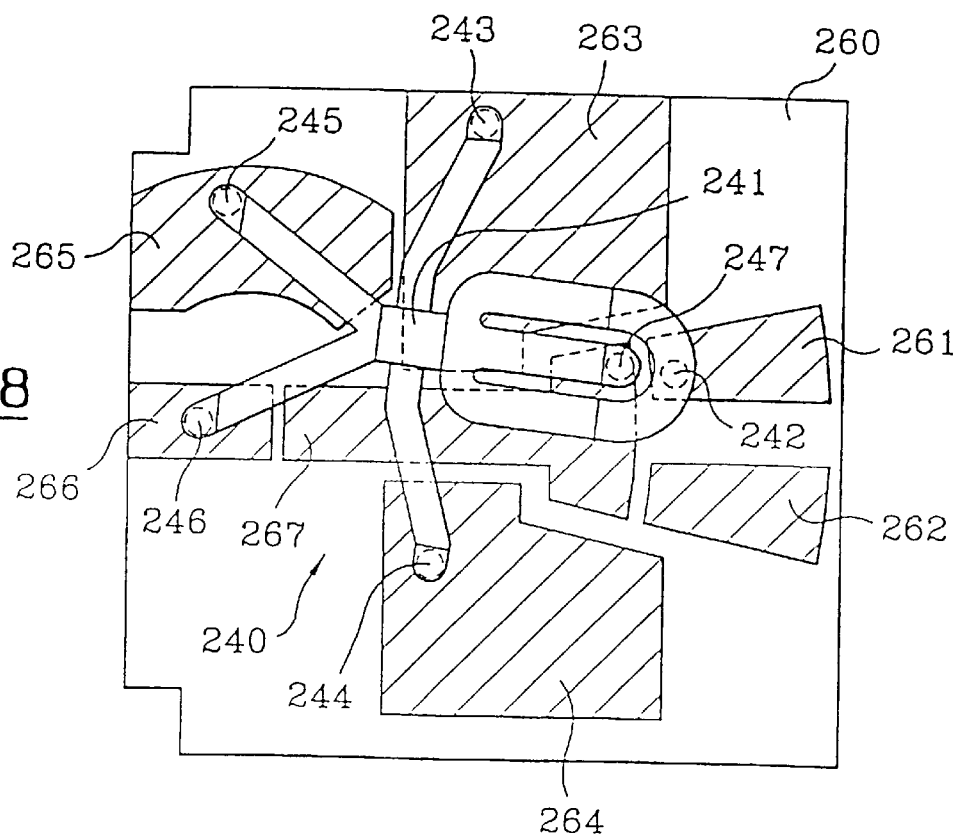
Figure 19:
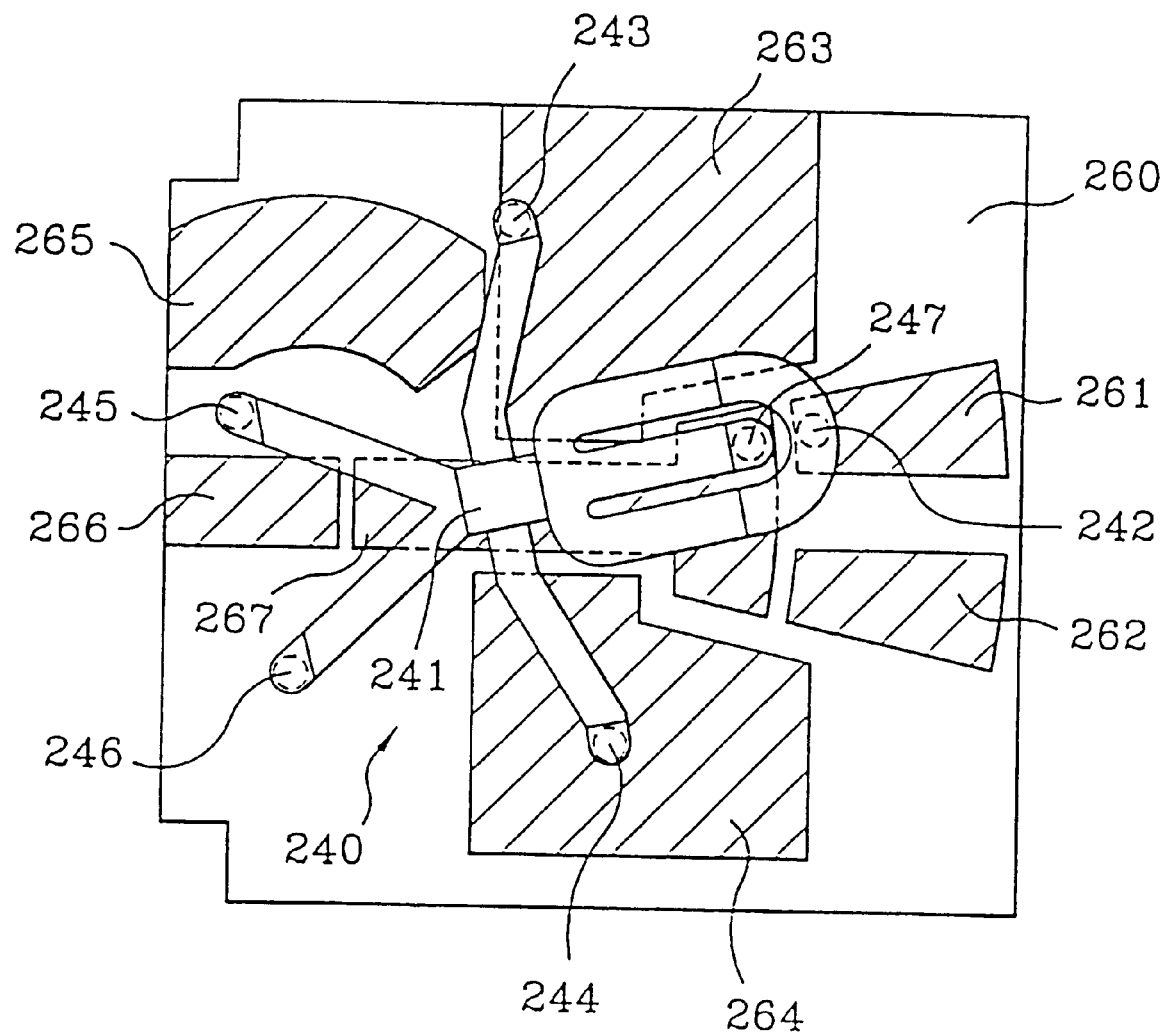
Figure 20C:
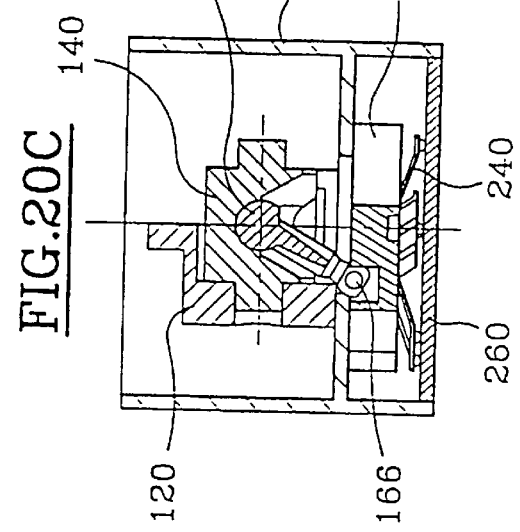
Figure 20A:
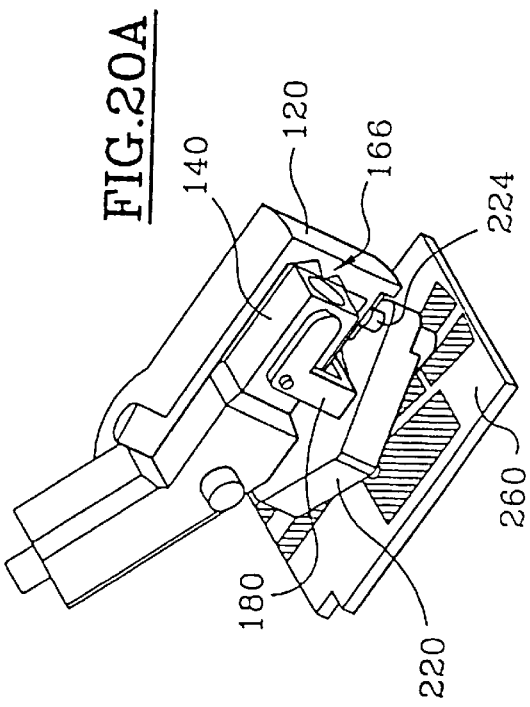
Figure 20B:
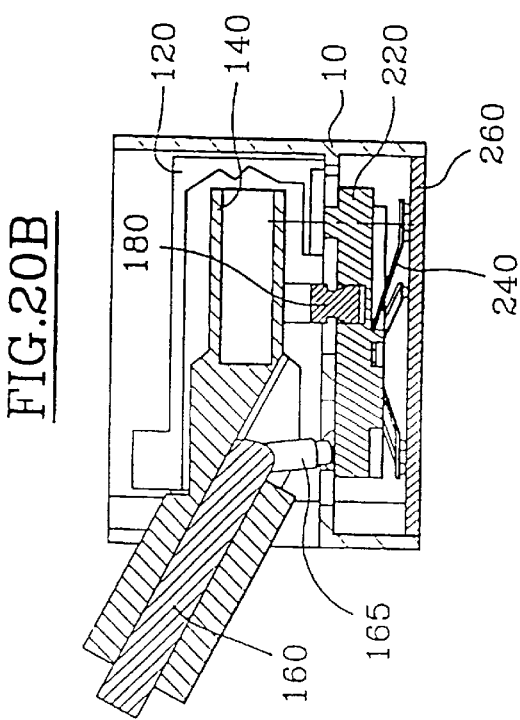
Figure 20D:
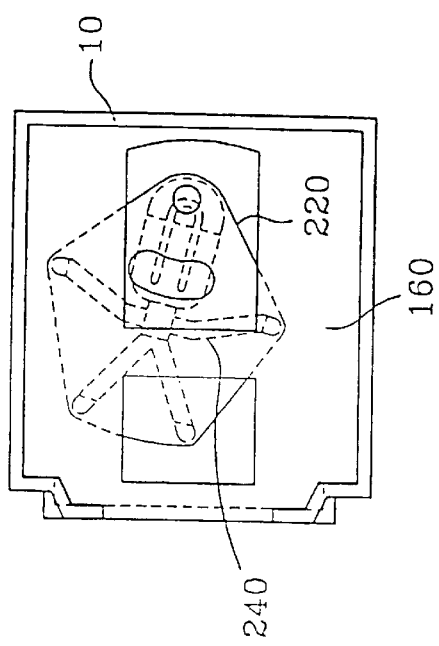
Figure 22C:
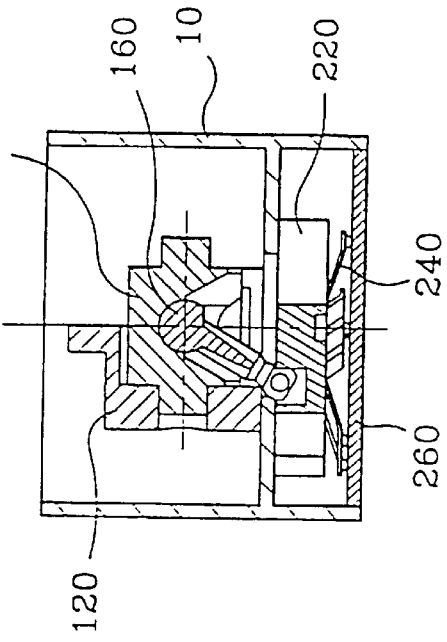
Figure 22A:
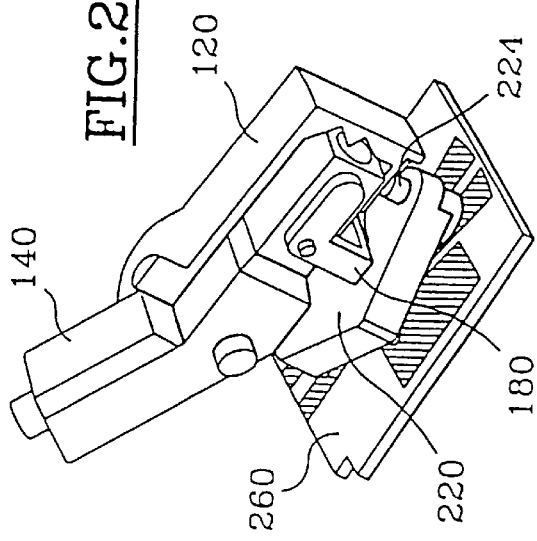
Figure 22B:
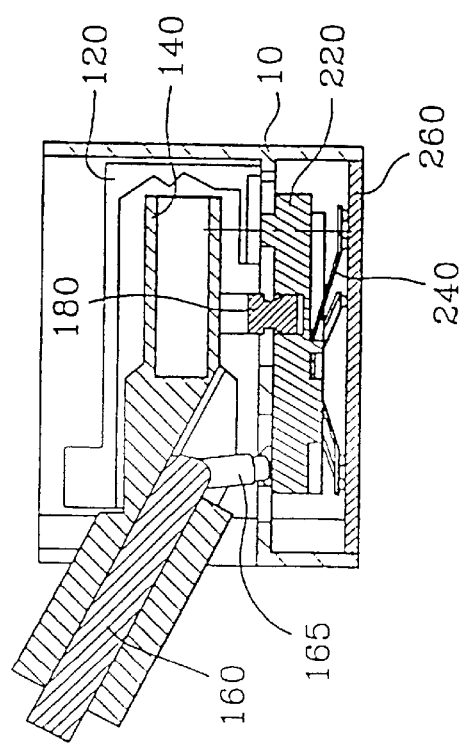
Figure 22D:
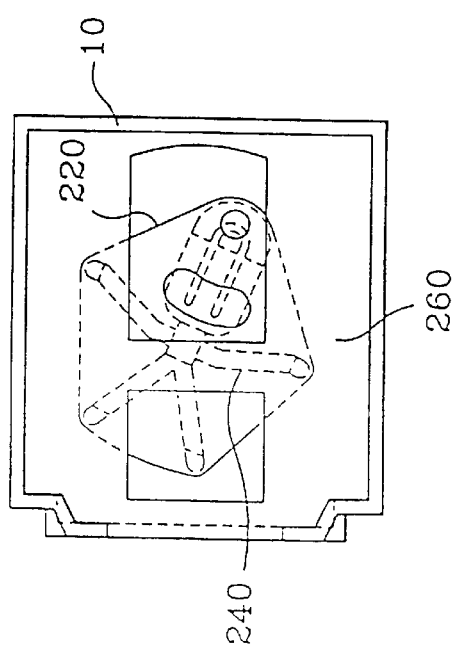
Figure 23A:
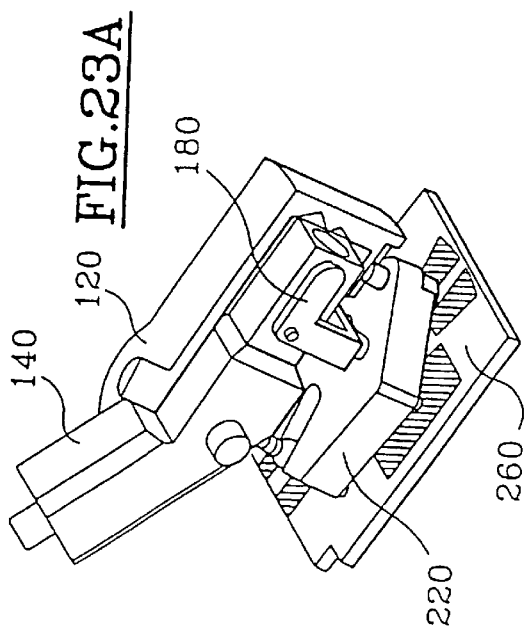
Figure 23C:
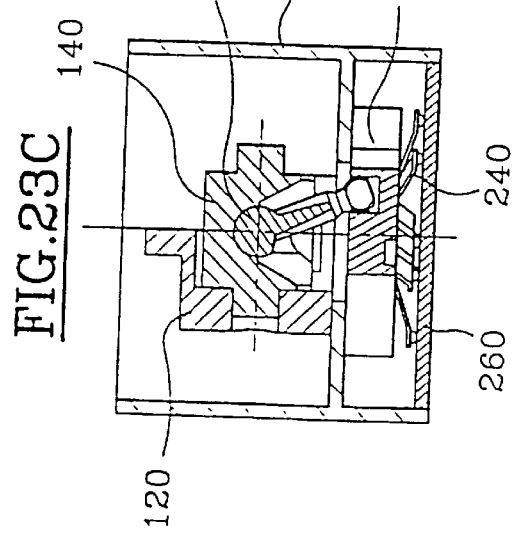
Figure 23B:
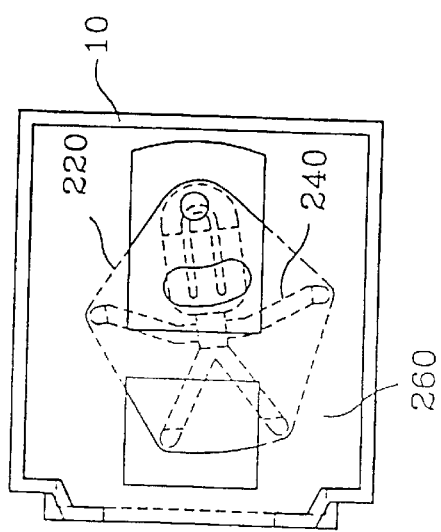
Figure 23D:
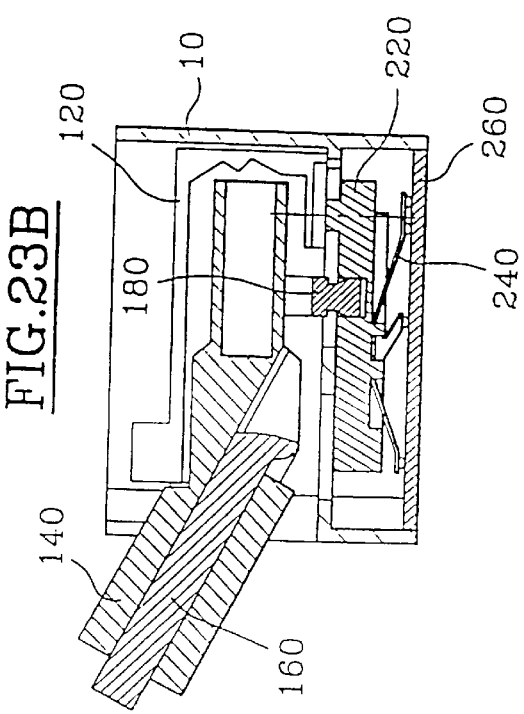
Figure 25C:
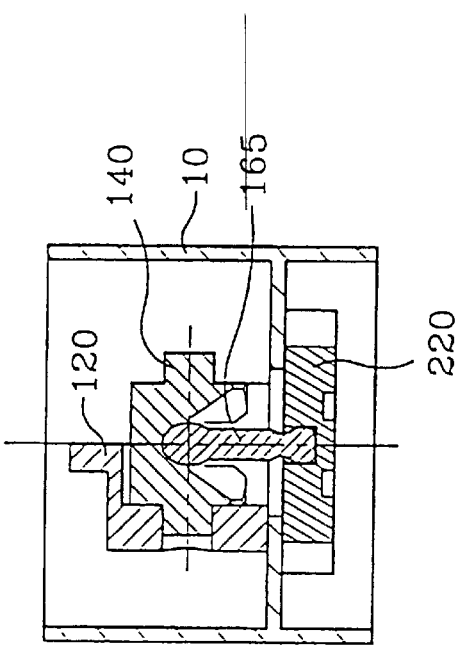
Figure 25A:
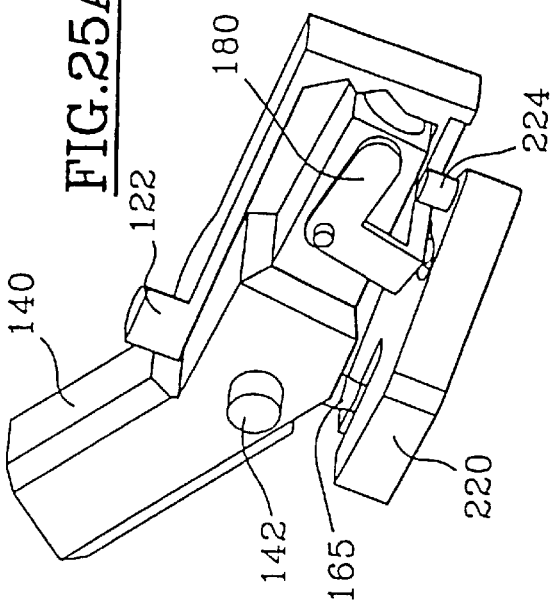
Figure 25B:
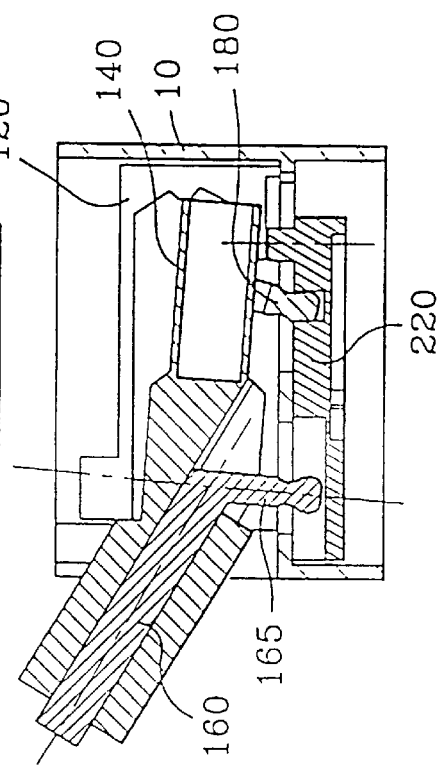
Figure 25D:
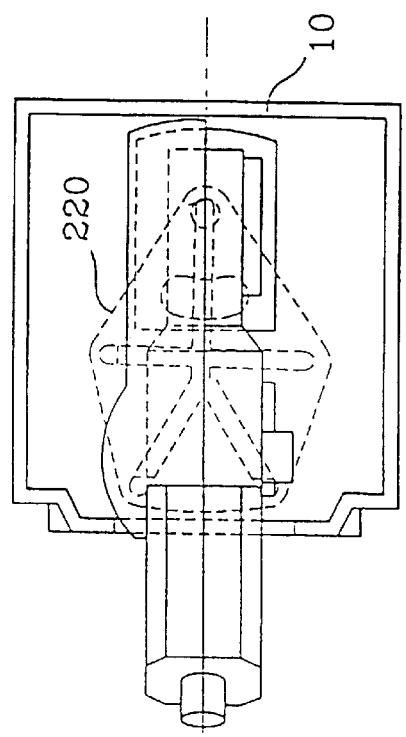

FIGS. 9 to 19 show the relative positions of the contacts 240 and of the circuit 260 in the following positions:

FIG. 9: powering the sidelights and the left indicators;

FIG. 10: powering the sidelights;

FIG. 11: powering the sidelights and the headlight flash;

FIG. 12: powering the sidelights, the headlight flash, and the left indicators;

FIG. 13: powering the sidelights, the low beam, and the headlight flash;

FIG. 14: powering the sidelights and the low beam;

FIG. 15: powering the sidelights, the low beam, and the right indicators;

FIG. 16: powering the sidelights, the high beam, and the right indicators;

FIG. 17: powering the sidelight, the high beam, and left indicators;

FIG. 18: powering the sidelights, the low beam, the headlight flash, and left indicators; and FIG. 19: powering the headlight flash and the left indicators.

By comparing FIGS. 9 to 19, the person skilled in the art will understand that the cooperation defined between the contacts 242 to 247 and the tracks 261 to 267 enables each of the switch functions to be modified individually without affecting any others of the potential functions.

According to advantageous characteristics of the present invention, it can be observed that:

the contact tips provided on the branches 242 and 247 which ensure the indicator and headlight-flash switch functions are substantially centered on the pivot axis embodied by the pin 224; and in the side-and-headlights-on position, the low-beam contact block provided on the branch 246 is substantially centered on the axis of the finger 165, and the pivot axis Ic of the fork 120.

Figure 5:
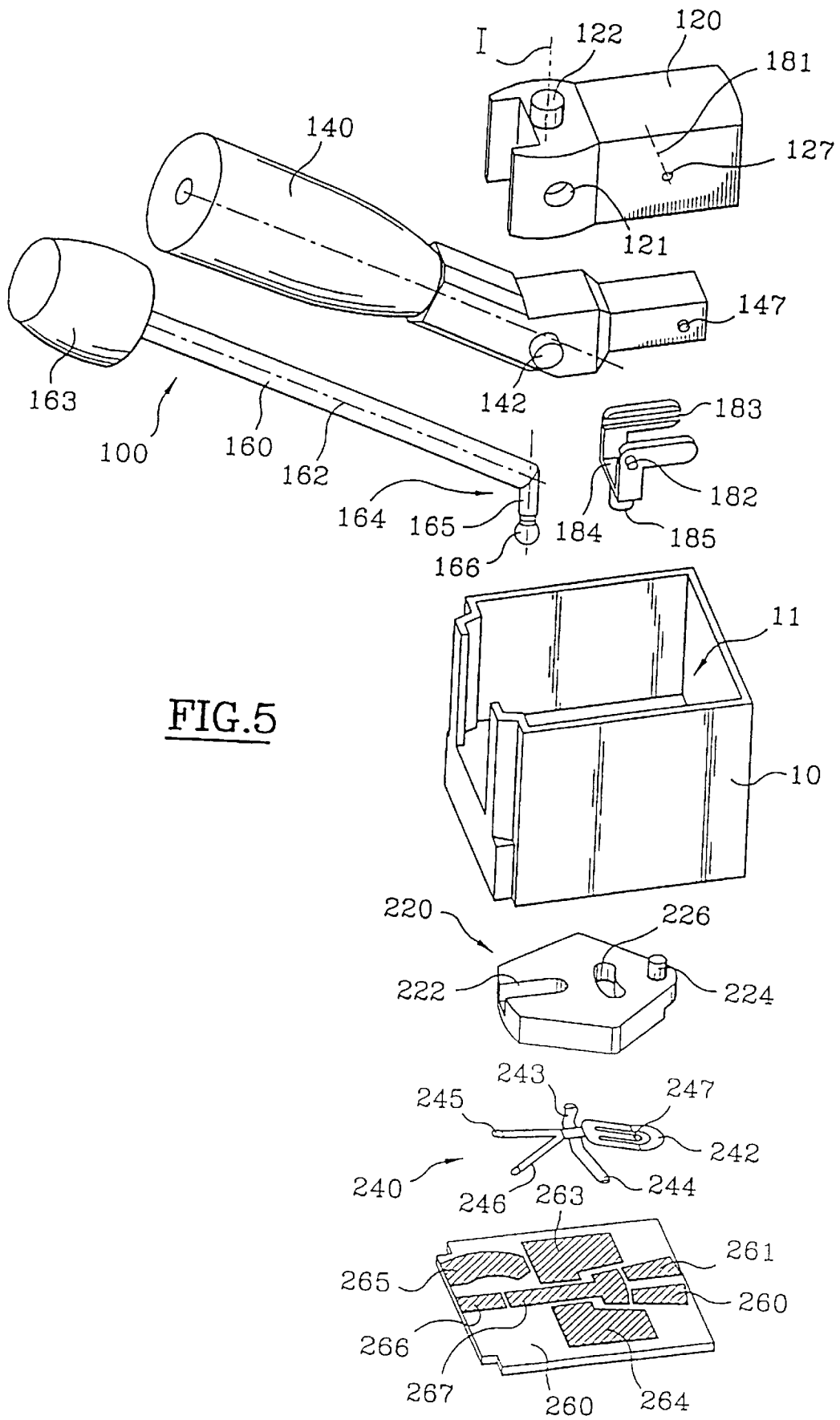
Figure 6:
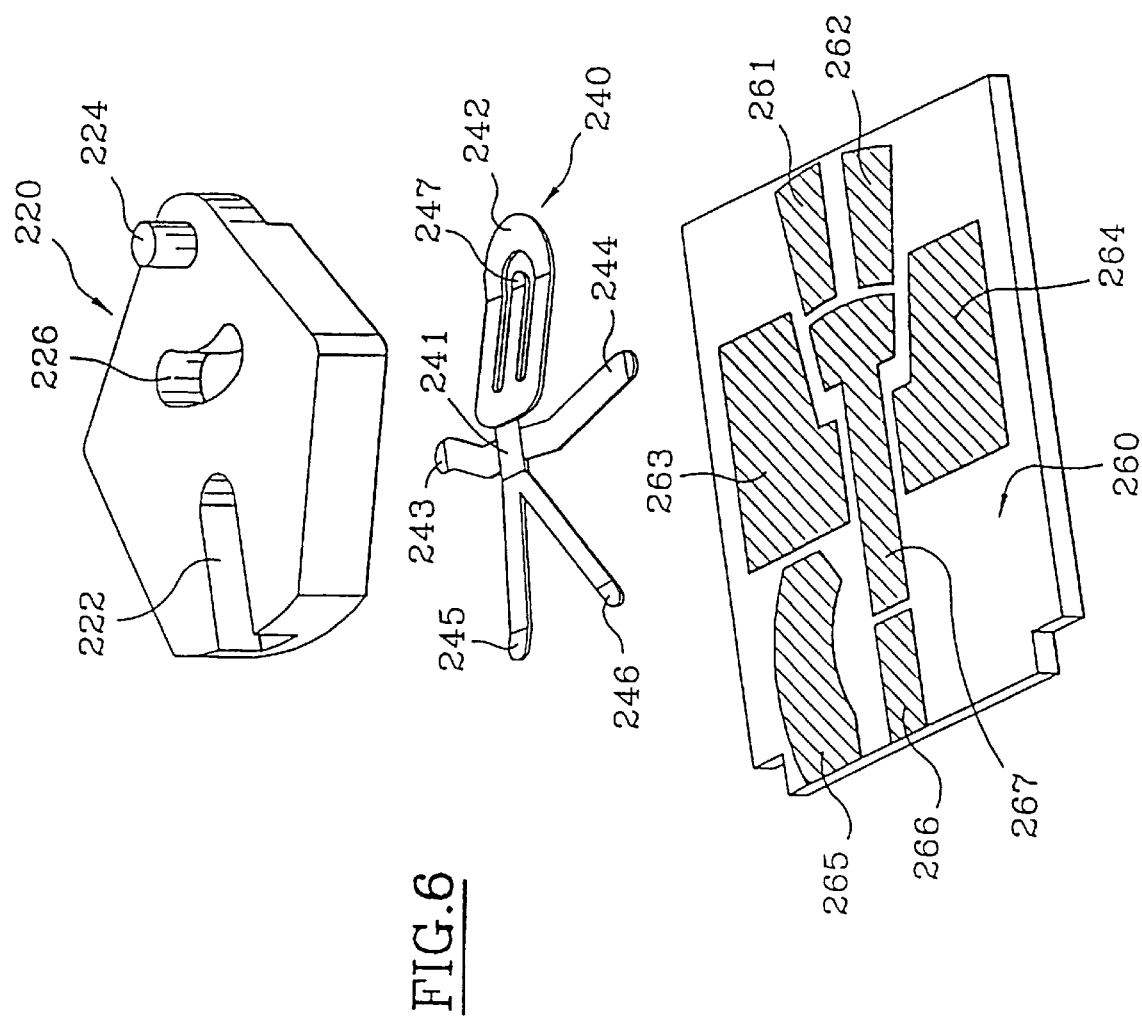
FIG. 6 is an exploded perspective view of electrical contacting means of the present invention.
Figure 7:
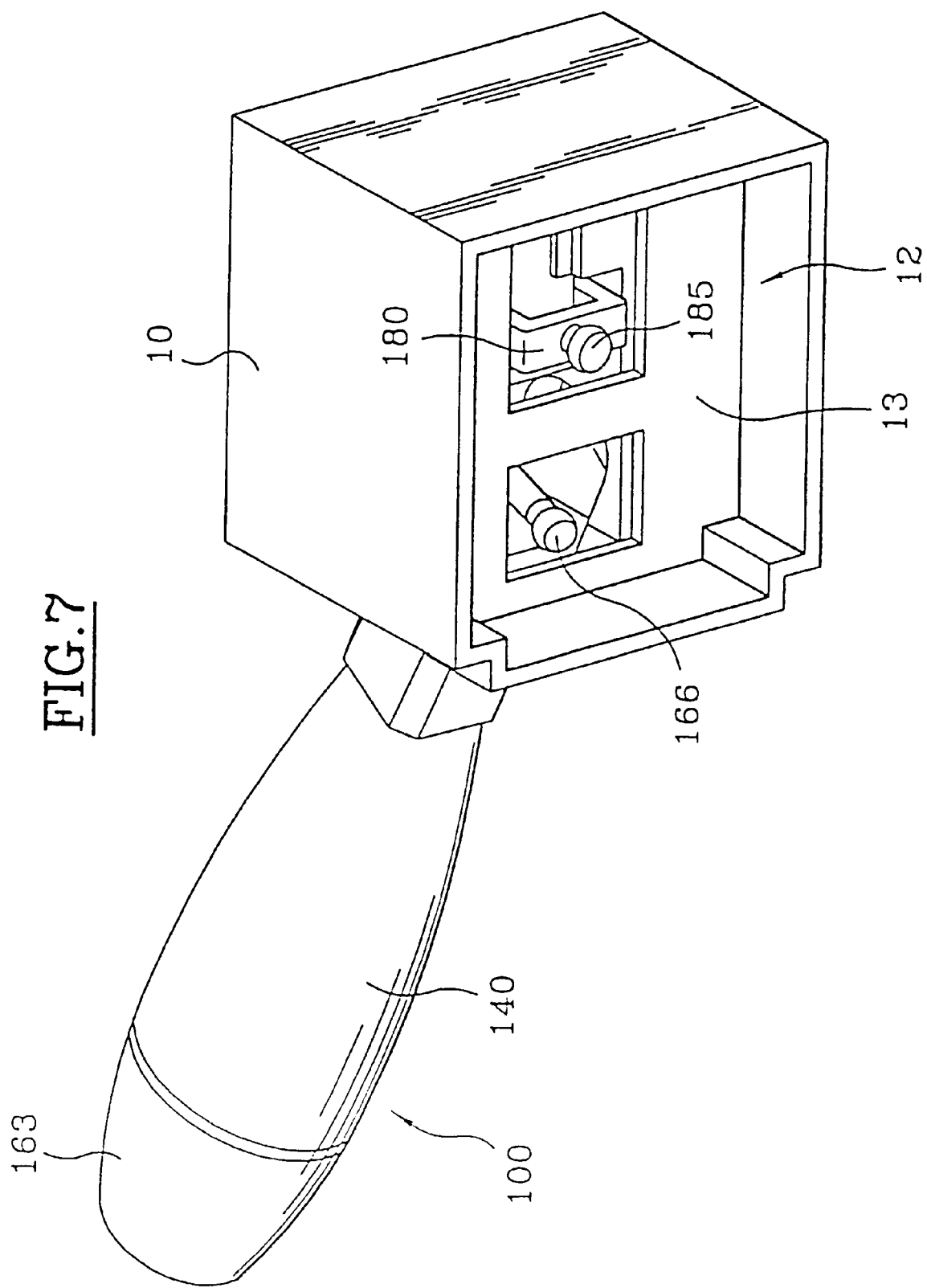
FIGS. 7 and 8 are fragmentary views in perspective of a switch of the present invention.
Figure 8:
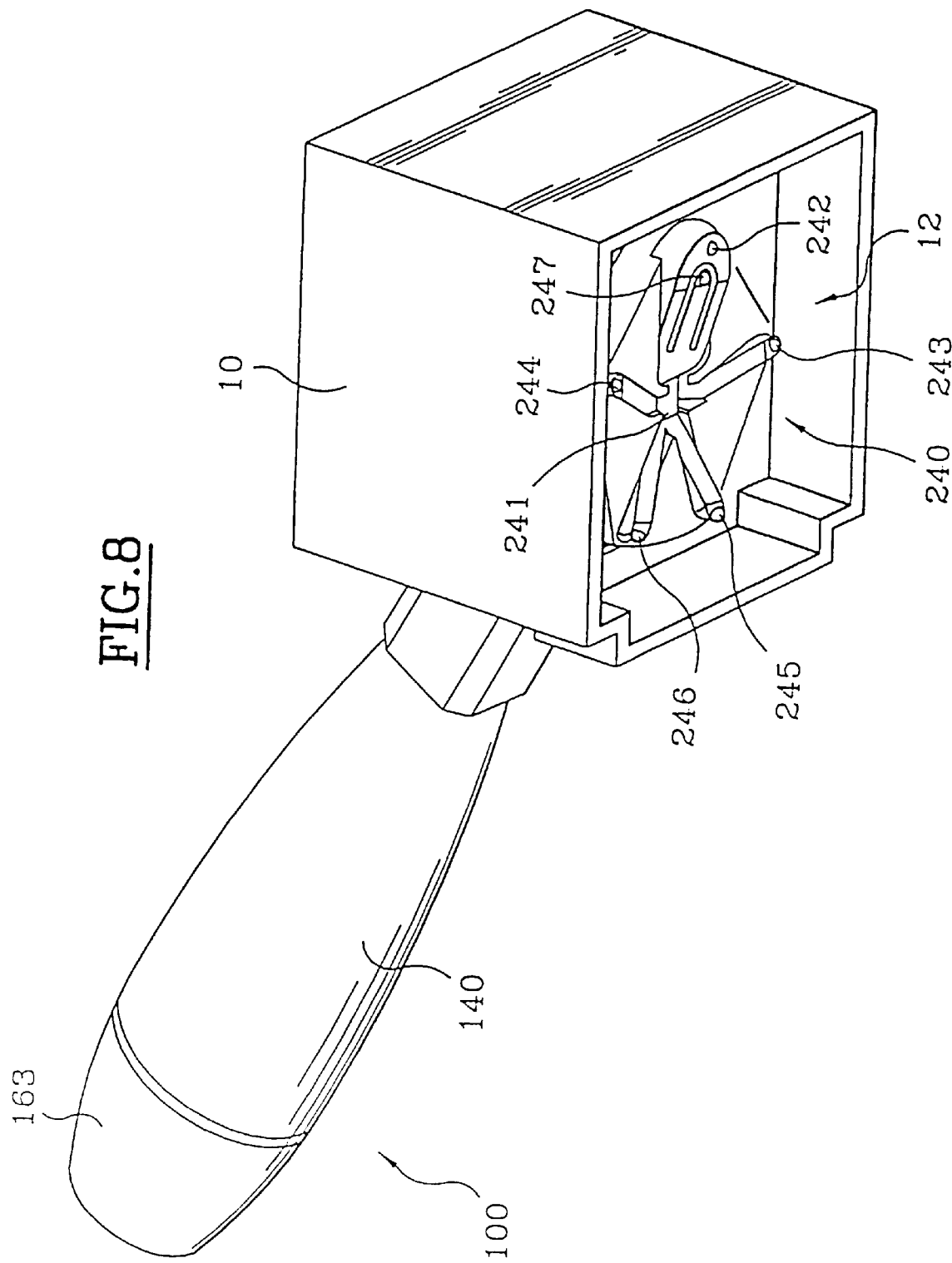

FIGS. 4 and 5 show a variant embodiment of the present invention in which the switch further includes a rocker 180 which ensures connection between the lever body 140 and the contact-carrier 220.

The aim of the rocker 180 is to amplify the displacement of the contact-carrier 220 when the body 140 is pivoted about the axis IIc.

The rocker 180 is generally fork-shaped, and each tine of the fork includes two branches which are orthogonal to each other.

The rocker 180 is mounted to pivot on the fork 120 about an axis 181 parallel to the pivot axis IIc of the body 140, but separate from said axis IIc. The axis 181 is embodied by pins 182 formed on the rocker 180 and engaged in complementary openings 127 formed in the fork 120.

The branches of the rocker 180 which are parallel to the distal end of the body 140 and respectively placed on either side thereof, include respective rectilinear guides 183 which receive respective pins 147 which project from the flanks of the distal end of the body.

The web 184 of the rocker 180 carries a projecting pin 185 which penetrates into a curved groove 226 formed in the contact-carrier 220. The groove 226 is formed by a cylindrical sector which is centered about the axis of the pin 224.

In addition, in the embodiment of FIGS. 4 and 5, the opening 222 is formed by a groove situated in the plane of symmetry of the contact-carrier 220 which substantially coincides with the longitudinal axis 162.

When the body 140 is driven to pivot relative to the fork 120 about the axis IIc, the rocker 180 is driven to pivot about the axis 127, thereby amplifying the pivoting motion of the pin 185, and consequently the amplitude of the resulting translation of the contact-carrier 220.

A switch of the present invention is shown in FIGS. 20 to 25 in the following respective positions:

FIG. 20: powering the side-and-headlights-on position with high-beam;

FIG. 21: powering the side-and-headlights-on position with low-beam, and the left indicators;

FIG. 22: powering the side-and-headlights-on position with low-beam, and the right indicators;

FIG. 23: powering the zero position;

FIG. 24: powering the side-and-headlights-on position with high beam, and the left indicators; and FIG. 25: powering the sidelights-on position, and the headlight-flash position.

In the context of the present invention, the switch may be used directly to switch the power supply required for the lighting or indicator means. Consequently, it suffices to adapt the contacts 240 and the associated tracks 260. In this case, the indexing means associated with the elements of the lever 100 must define the positions that are stable.

However, in a variant, the switch of the present invention may be used in pulse mode, the switch effect generated by the contacts 240 cooperating with the tracks 260 controlling relays or equivalent means, themselves designed to switch the power required. In this case, the indexing means associated with the elements of the lever 100 must define the positions that are unstable, e.g. in the form of simple cone-or sphere-shaped ramps.

In addition, the ergonomics of the switch may be varied in numerous ways.

For example, in the case of a pulse type control, the high-beam and headlight-flash positions may be obtained by pivoting the body 140 about the axis IIc in the same direction as a rest position. In this case, it is also possible to make use of translation of the driver 160 along its axis to move the contact-carrier 220 in translation in a direction opposite to the translation movement resulting from the above-mentioned pivoting of the body 140, e.g. in order to control rear fog lamps.

Compared with known conventional systems, the present invention presents the particular advantage of reducing the cost of manufacturing electrical switches and of improving reliability because of the ease with which it can be implemented.

Naturally, the present invention is not limited to the embodiments described above, but extend to any variants within the spirit thereof.

What is claimed is:

1. An electrical switch, for controlling the lighting and signaling means of a motor vehicle, the switch comprising a housing (10) which houses switch means (200), and a lever (100) having a longitudinal axis and which includes control means (120, 140, 160) that are mounted to be displaced relative to the housing (10) in at least two pivoting motions which are generally mutually crossed (I, II) and in rotary motion (III) about the longitudinal axis (162) of the lever (100) in order to control respective ones of at least three basic electrical functions, wherein the switch means (200) comprise a single slide (220) which is mounted to be displaced in a plane, and functional connection means (166, 222; 124, 224) ensuring functional connection between the control means (120, 140, 160) of the lever (100) and the slide (220), so that the slide (220) is subjected to a specific kind of displacement and ensures said respective electrical functions for each of the two pivoting and rotary motions of the lever (100).

2. A switch according to claim 1, wherein an element (160) of the lever (100) is also capable of a motion in translation along said longitudinal axis (162) in order to perform a fourth electrical function, and wherein additional functional connection means are also provided for functionally connecting said element (160) and the slide (220).

3. A switch according to claim 1 or 2, wherein the control means comprise a fork (120) which is guided to pivot inside the housing (10) about a main axis (Ic), a lever body (140) which emerges outside the housing (10) and is mounted to pivot on the fork (120) about an auxiliary axis (IIc), and a driver (160) formed by a rod housed in the lever body (140) and capable of rotating relative to the lever body (140) about said longitudinal axis (162).

4. A switch according to claim 3, wherein the main axis (Ic) of the fork (120) and the auxiliary axis (IIc) of the body (140) are orthogonal.

5. A switch according to claim 3, wherein the driver (160) is also capable of longitudinal translation relative to the body (140).

6. A switch according to claim 3, wherein a proximal end (163) of the driver (160) emerges outside of the body (140) and of the housing (10) so that said proximal end of the driver can be accessed by a user, while a distal end (164) of the driver (160), inside the housing (10), emerges from the body (140) and includes a finger which is offset relative to the longitudinal axis (162) of the driver (160).

7. A switch according to claim 6, wherein an axis of the finger (165) provided at the distal end (164) of the driver (160) substantially coincides with a pivot axis (Ic) of the fork (120).

8. A switch according to claim 3, wherein said switch further includes a rocker (180) which ensures connection between the lever body (140) and the slide (220).

9. A switch according to claim 8, wherein the rocker (180) is designed to amplify displacement of the slide (220) when the body (140) is pivoted.

10. A switch according to claim 9, wherein the rocker (180), comprises a fork including two tines and each tine of the fork includes two branches which are orthogonal to each other.

11. A switch according to claim 9, wherein the rocker (180) is mounted to pivot on the fork (120) about an axis (181) parallel to a pivot axis (IIc) of the body (140), but separate from said pivot axis (IIc).

12. A switch according to claim 10, wherein the branches of the rocker (180) which are parallel to a distal end of the body (140) include respective rectilinear guides (183) which receive respective pins (147) which project from flanks of the distal end of the body (140).

13. A switch according to claim 9, wherein a web (184) of the rocker (180) carries a projecting pin (185) which penetrates into a curved groove (226) formed in the slide (220).

14. A switch according to claim 13, wherein groove (226) is formed by a cylindrical sector which is centered about a axis of the pin (224), ensuring cooperation between the slide (220) and the fork (120).

15. A switch according to claim 3, wherein said switch is provided with functional connection means (166, 222; 124, 224) ensuring functional connection between the slide (220), the driver (160), and the fork (120).

16. A switch according to claim 15, wherein the connection between the slide (220) and the driver (160) is ensured by a ball (166) formed on an end of a finger (165) and engaged in a corresponding opening (222) of the slide (220).

17. A switch according to claim 16, wherein the opening (222) of the slide (220) has circular symmetry or is a hemisphere, and is complementary to the ball (166).

18. A switch according to claim 11, wherein the rocker is designed to amplify displacement of the slide when the body is pivoted and an opening (222) of the slide (220) is formed by a groove situated in a plane of symmetry of the slide (220).

19. A switch according to claim 18, wherein the connection between the slide (220) and the fork (120) is provided by a pin (224) which projects from a top surface of the slide (220) and is engaged in a groove (124) formed in the fork (120).

20. A switch according to claim 19, wherein a longitudinal axis of the groove (124) is coplanar to the longitudinal axis (162) of the lever (160), while the axis of the pin (224) formed on the slide (220) is parallel to the pivot axis of the fork (120).

21. A switch according to claim 1, wherein switch means (200) placed in the housing (10) comprise contacts (240) connected to the slide (220), and an electrical circuit (260) including electrically conductive tracks.

22. A switch according to claim 21, wherein the contacts (240) are a single star-shaped part of resilient electrically conductive material.

23. A switch according to claim 21 or 22, wherein the contacts (240) are a non-planar star having a central base (241) and six branches (242 to 247).

24. A switch according to claim 23, wherein the base (241) is connected to the slide (220).

25. A switch according to claim 23, wherein each branch (242 to 247) is provided with a contact tip at its free end remote from the base (241), which contact tip cooperates with a track (261 to 267) of the electrical circuit (260).

26. A switch according to claim 21, wherein the contacts (240) possess a plane of symmetry which substantially coincides with the longitudinal axis (162) of the lever.

27. A switch according to claim 21, wherein the contacts (240) comprise:

two lateral branches (243 and 244) which are generally transverse to a plane of symmetry, and which cooperate with respective tracks (263 and 264) for powering the switch;

two V-shaped other branches (245 and 246) provided at one end of the base (241) which cooperate respectively for one of the V-shaped branches (245) with a track (265) to ensure that sidelights are powered, and for another V-shaped branch (246) with additional respective tracks (266 and 267) for powering either low beam or high beam;

a longitudinal branch (247) provided on an end of the base (241) remote from the V-shaped branches (245 and 246), said longitudinal branch cooperates with a track (267) to flash headlights; and a loop-shaped branch (242) which surrounds the longitudinal branch (247) and which cooperates with auxiliary additional respective tracks (261 and 262) to power either a right or a left direction-indicators.

28. A switch according to claim 21, wherein amplitudes and positions of the tacks (261 to 267) are designed to ensure that selected electrical switch effects are maintained whatever states of other futures or whatever changes therein.

29. A switch according to claim 21, wherein two of the conductive tracks (261 and 262) are formed by areas constituting sectors of a ring, said areas are symmetrical about a plane which substantially coincides with the longitudinal axis (162) of the lever, and a gap is left between said two tracks (261 and 262) to enable at least one tip of a branch (242 and 247) to pass without making physical contact.

30. A switch according to claim 21, wherein two of the conductive tracks (266 and 267) are essentially formed by rectangular areas which are in alignment along a plane of symmetry, one of the two tracks possessing an enlarged head.

31. A switch according to claim 21, wherein one of the conductive tracks a track (265) is formed by a sector of a ring which is centered on an axis of an offset finger (165) which is formed on a distal end of the driver (160).

32. A switch according to claim 1, wherein contact tips provided on contact branches (242 and 247) which ensure indicator and headlight-flash switch functions are substantially centered on a pivot axis of the slide (220) embodied by a pin (224) which ensures connection between the slide (220) and a fork (120).

33. A switch according to claim 1, wherein, in side-and-headlights-on position, a low-beam contact block provided on a contact branch (246) is substantially centered on an axis of an offset finger (165) provided on an end of a driver, and a pivot axis (Ic) of a fork (120).

34. A switch according to claim 1, wherein a first pivot plane of the lever (100) corresponds to controlling a direction-indicator, and a second pivot plane, which is orthogonal to the first pivot plane, corresponds to a switch for low-beam/high-beam control of headlights or for unstable headlight-flasher control.

35. A switch according to claim 1, wherein rotating the lever (100) about an axis corresponds to a lighting selection off, sidelights-on, or side-and-headlights-on.

36. A switch according to claim 1, wherein translation of the lever (100) corresponds to a fog-light control.

37. A switch according to claim 1, wherein the switch is used directly to switch power supply required for lighting or indicator means.

38. A switch according to claim 37, wherein said switch comprises indexing means associated with elements of the lever (100) defining positions that are stable.

39. A switch according to claim 1, wherein cooperation of contacts (240) and tracks (260) forming the switch means (200) control relays or equivalent means designed to switch power required.

40. A switch according to claim 39, wherein said switch comprises indexing means associated with elements of the lever (100) defining positions that are unstable.

* * * * *

UNITED STATES PATENT AND TRADEMARK OFFICE
CERTIFICATE OF CORRECTION

PATENT NO. : 6,103,980
DATED : August 15, 2000
INVENTOR(S) : Gauthier

Page 1 of 1

It is certified that error appears in the above-identified patent and that said Letters Patent is hereby corrected as shown below:

In References Cited, Item[56], under U.S. Patent Documents at 5,780,794, Delete "20/61.54" and insert -- 200/61.54 --.

Claim 3, page 7
Line 3, delete "(lic)" and insert -- (IIc) --.

Claim 14,
Before "groove (226)" insert -- the.

Claim 21,
Before "switch means (200)", insert -- the --.

Claim 27,
Before "respective tracks (263 and 264)" insert --the --.

Claim 31,
Delete "conductive tracks a track" and insert -- conductive tracks --.

Signed and Sealed this

Twenty-sixth Day of June, 2001

Attest:

NICHOLAS P. GODICI
*Attesting Officer*     *Acting Director of the United States Patent and Trademark Office*